(12) United States Patent
Brady et al.

(10) Patent No.: US 11,157,220 B2
(45) Date of Patent: Oct. 26, 2021

(54) CONNECTING AN IMAGE PROCESSING DEVICE VIA A MOBILE DEVICE

(71) Applicant: Canon Kabushiki Kaisha, Tokyo (JP)

(72) Inventors: Nigel Brady, Irvine, CA (US); Nobuyuki Iwauchi, Irvine, CA (US); Yunzhe Zhao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/716,162

(22) Filed: Dec. 16, 2019

(65) Prior Publication Data

US 2020/0192613 A1    Jun. 18, 2020

Related U.S. Application Data

(60) Provisional application No. 62/780,664, filed on Dec. 17, 2018, provisional application No. 62/863,086, filed on Jun. 18, 2019.

(51) Int. Cl.
*G06F 3/12* (2006.01)
*G06K 9/00* (2006.01)

(52) U.S. Cl.
CPC .......... *G06F 3/1231* (2013.01); *G06F 3/1204* (2013.01); *G06F 3/1232* (2013.01); *G06F 3/1238* (2013.01); *G06F 3/1292* (2013.01); *G06K 9/00201* (2013.01)

(58) Field of Classification Search
None
See application file for complete search history.

(56) References Cited

U.S. PATENT DOCUMENTS

| | | |
|---|---|---|
| 8,230,075 B1 | 7/2012 | Weskamp et al. |
| 8,839,379 B2 | 9/2014 | Sammon et al. |
| 9,066,326 B2 | 6/2015 | Narayan et al. |
| 9,113,286 B1 | 8/2015 | Adams et al. |
| 9,323,713 B2 | 4/2016 | Liansky et al. |
| 9,383,746 B2 | 7/2016 | Ha et al. |
| 9,900,404 B2 | 2/2018 | Mathison et al. |
| 10,033,886 B2 | 7/2018 | Yasuma |
| 10,068,403 B1 | 9/2018 | McGehee |

(Continued)

OTHER PUBLICATIONS

Purcher, J., "Apple Invents New Quick Scanning Method of Automatically Accessing New Wireless Networks", Mar. 6, 2014.

(Continued)

*Primary Examiner* — Thomas D Lee
(74) *Attorney, Agent, or Firm* — Canon U.S.A., Inc., IP Division

(57) ABSTRACT

A communication apparatus automatically establishes a wireless communication connection with an image processing apparatus. The communication apparatus captures one of more images of the image processing apparatus and determines, via image recognition process the identification information associated with the image processing apparatus. The communication apparatus automatically searches configuration information matching the identification information of the image processing apparatus and initiates the communication connection request. Communication apparatus provides the status information on a display screen of the communication apparatus and establishes a connection between the image processing apparatus and the communication apparatus.

16 Claims, 18 Drawing Sheets

(56) References Cited

U.S. PATENT DOCUMENTS

| | | |
|---|---|---|
| 2013/0027737 A1 | 1/2013 | Suzuki |
| 2013/0188046 A1 | 7/2013 | Kong |
| 2014/0380443 A1 | 12/2014 | Stark et al. |
| 2015/0188896 A1* | 7/2015 | Slick ................. H04L 63/08 713/171 |
| 2016/0191337 A1 | 6/2016 | Schiewe |
| 2016/0217617 A1 | 7/2016 | Barribeau |
| 2016/0379176 A1 | 12/2016 | Brailovskiy et al. |
| 2019/0037086 A1* | 1/2019 | Tokuchi ................. H04W 4/80 |
| 2019/0332334 A1 | 10/2019 | Yoshihara et al. |

OTHER PUBLICATIONS

Redmon, J., "How computers learn to recognize objects instantly", TED, Aug. 18, 2017; https://www.youtube.com/match?v=Cgxsv1riJhl.

"Google Glass: How to pair your Android phone", Nov. 7, 2013; https://www.youtube.com/watch?v=JnUVTBDT8_o&feature=youtu.be.

"RICOH Smart Device Connector", Jun. 21, 2016; https://www.youtube.com/watch?time_continue=157&v=lwpzjcQ3X-U.

Murphy, D., "Identify All the Devices on Your Network Easily With the Fing App", Apr. 12, 2018; https://lifehacker.com/ios-android-app-of-the-week-fing-network-scanner-1825205516.

"QR Codes and NFC Tag Secure Printing with Sentinel", https://www.epapersign.com/qr-and-nfc-codes.

* cited by examiner

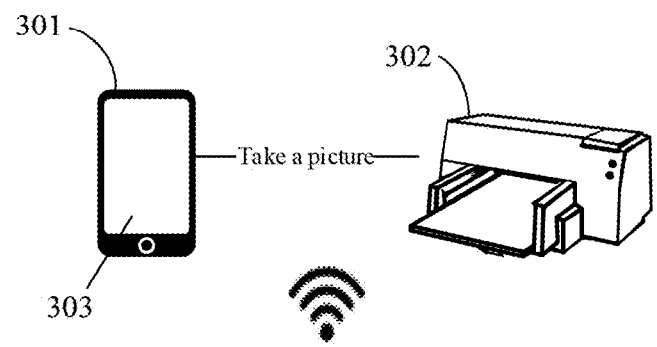
Fig. 3A
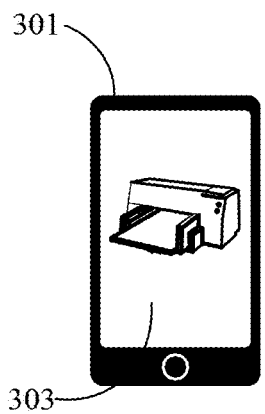
Fig. 3B
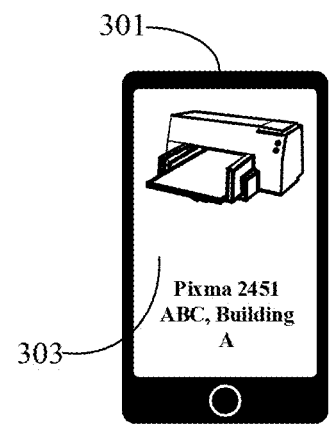
Fig. 3C
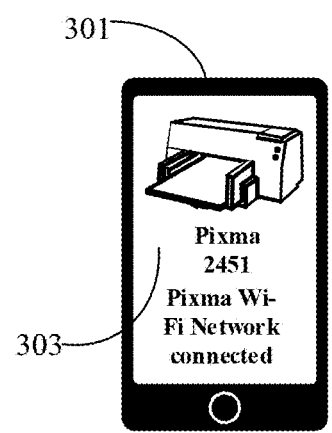
Fig. 3D
FIG. 3

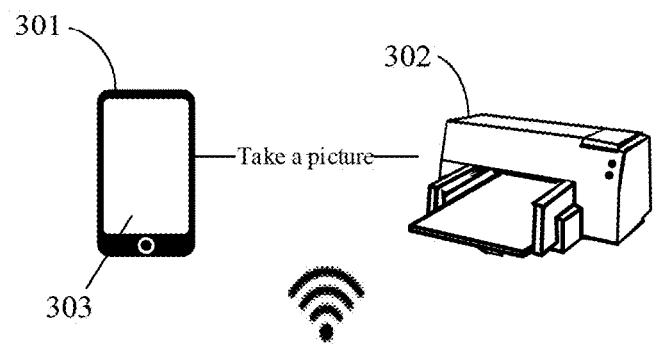
Fig. 4A
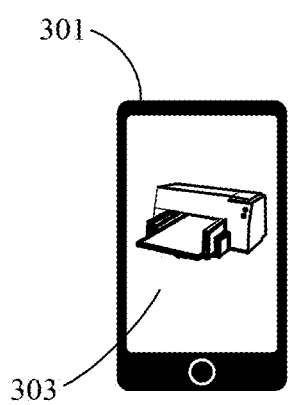
Fig. 4B
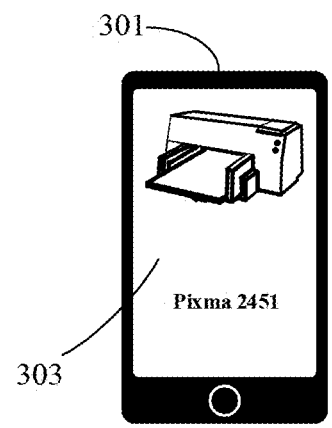
Fig. 4C
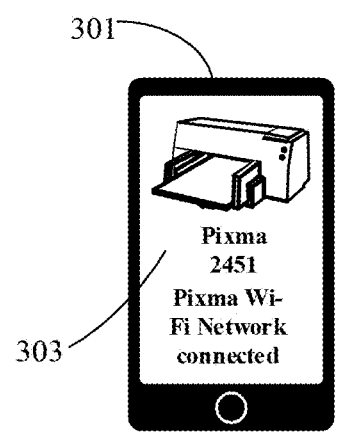
Fig. 4D
FIG. 4

CONNECTING AN IMAGE PROCESSING DEVICE VIA A MOBILE DEVICE

CROSS-REFERENCE TO RELATED APPLICATIONS

This application claims the benefit of U.S. Provisional Patent Application No. 62/780,664, filed on Dec. 17, 2018, and U.S. Provisional Patent Application No. 62/863,086, filed on Jun. 18, 2019, both of which are hereby incorporated by reference herein in their entirety.

TECHNICAL FIELD

The present disclosure relates generally to connecting an image processing device via a handheld device, more specifically, using an image of an image processing device to establish communication.

DESCRIPTION OF THE RELATED ART

Mobile devices utilize various applications in order to perform a print job from an image processing device. There exist multiple ways to connect a mobile device to an image processing device. Some of these existing techniques are manually entering of the printer IP address and scanning a QR code or network auto-discovery (Bonjour protocol, etc.). However, these approaches do not provide an appropriate way to validate whether the user is able to connect the specific image processing device to the network or not.

SUMMARY

Methods, systems, and computer-readable media for connecting an image processing device via mobile device are described, and some of these embodiments provide a connection mechanism that can automatically identify and validate the connection information of the mobile device and the desired image processing device.

According to one aspect of the present disclosure there is provided a communication apparatus that automatically establishes a wireless connection, via a network, with an image processing apparatus. The communication apparatus comprises a memory storing a program and one or more processors which, by executing the program, cause the communication apparatus to capture one or more images of the image processing apparatus. The communication apparatus determines, via image recognition processing, identification information associated with the image processing apparatus from one or more captured images. The communication apparatus thereby automatically searches configuration information matching the determined identification information and initiates a connection request between the communication apparatus and the image processing apparatus when matching configuration information is obtained.

According to another aspect of the present disclosure there is provided a communication apparatus that automatically establishes a wireless connection, via a network, with an image processing apparatus. The communication apparatus comprises a memory storing a program; and one or more processors which, by executing the program, cause the communication apparatus to capture one or more images of the image processing apparatus. The communication apparatus determines, via image recognition processing, identification information associated with the image processing apparatus from one or more captured images. The communication apparatus thereby automatically searches a network for one or more network identifiers matching the determined identification information and initiates a connection request between the communication apparatus and the image processing apparatus when a matching network identifier is obtained. The communication apparatus initiates the connection request, which causes the image processing apparatus to output an indicator pattern, and the communication apparatus captures one or more images of the indicator pattern output by the image processing apparatus to obtain the pattern and decodes the pattern in the captured one or more images of the indicator to obtain the status information associated with the image processing apparatus. The communication apparatus provides the status information on a display screen of the communication apparatus and establishes a connection between the image processing apparatus and the communication apparatus.

Further features will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIGS. 3A-3D illustrate an exemplary embodiment of a system for using an embodiment of a print application.

FIGS. 4A-4D illustrate an exemplary embodiment of a system for using a embodiment of a print application.

DETAILED DESCRIPTION

Figure 1:
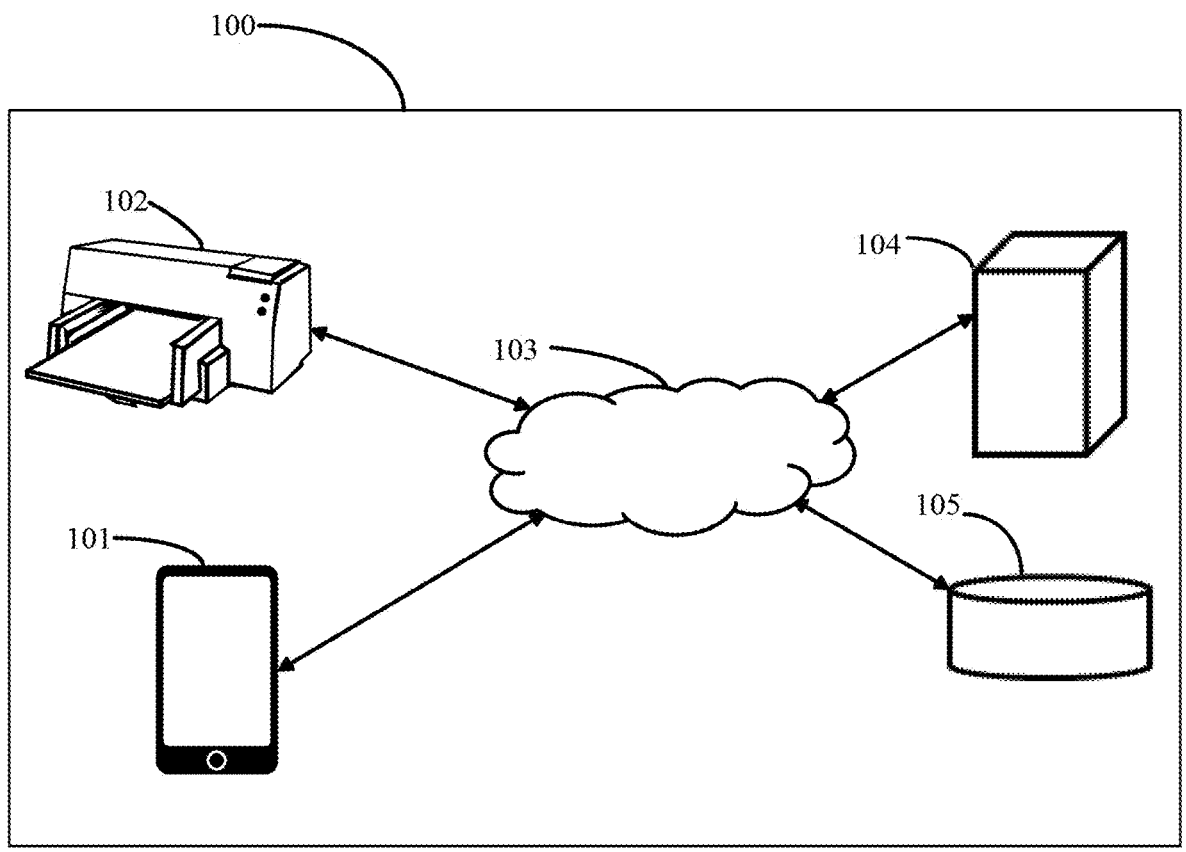
FIG. 1 illustrates an overview of a system for implementing embodiments of the present disclosure.

The following paragraphs describe certain explanatory embodiments. Other embodiments may include alternatives, equivalents, and modifications. Additionally, the explanatory embodiments may include several features, and a particular feature may not be essential to some embodiments of the devices, systems, and methods that are described herein. The features of the various embodiments described herein below can be seen to operate individually or in combination with one another unless expressly noted otherwise.

Interaction with an image processing device (e.g., print device) may require a user to perform various steps in order to execute a task. This interaction may occur using a display menu of the print device, using driver software, or using a print application. This requires a user to follow multiple steps that make use of technical information and/or obtain administrative approvals to have the job output from the print device. For example, in case where a user is using a print application and a mobile device, a user may need to identify the print device, determine whether the user is allowed to access the identified print device, determine whether the identified print device is compatible with the required print job, and determine the configuration information of the identified print device to connect with the user's mobile device. These steps and interactions are time consuming and often provide no assurance whether it is feasible to connect the print device with user's mobile device. Therefore, various embodiment of the present disclosure advantageously provide an efficient and tangible interaction that enables a connection between a mobile device and a print device and causes a print job to be performed without any hassle.

Some embodiments of the present disclosure provide methods and systems that use image recognition technology to enable a communication connection between a mobile device and a print device. These methods and systems use image recognition technology to recognize the print device within an image frame as captured by the camera module of the mobile device. The captured image is analyzed to recognize the print device and determine associated device information, such as a model number or any associated device ID of the print device. Upon determining associated device information, a communication network is searched, using the associated device information for a member of the network corresponding to the recognized print device, to establish a connection between the mobile device and the print device. The communication network may include a Wi-Fi connection, a local network, or an internet connection over LAN or, WAN. Further, in some embodiments, once the connection between the mobile device and the print device has been established, additional operational processes validate the connection information between the mobile device and the print device by providing an indicator (e.g., audio signal, visual signal) that includes pattern information as a confirmation that the connection is successfully maintained between the user's mobile device and the print device to which the user wants to connect.

In some embodiments, methods and systems are provided which use image recognition technology to enable a communication connection between a mobile device and a print device. These methods and systems use image recognition technology to recognize the print device and its surroundings within an image frame as captured by the camera module of the mobile device. The captured image is analyzed to recognize the print device to determine associated device information and environment information (also referred as location information) of the print device. Upon determining the device information associated with the environment information of the print device, configuration information, associated with the determined device and environment information, is searched for. The configuration information may include communication network information, such as a Wi-Fi connection, a local network or internet connection over LAN or WAN, a Wi-Fi network name, and encryption type, and other information, such as any passwords, print device IP address, print device domain name, login setting information (e.g., Active Directory domain, department ID), default print settings (e.g., duplex, color mode), and print policies (e.g., whether user is allowed to print color or duplex). Further, in some embodiments, as stated above, once the connection between the mobile device and the print device has been established, additional operational processes validate the connection information between the mobile device and the print device by providing an indicator (e.g., audio signal, visual signal) that includes pattern information as a confirmation that the connection is successfully maintained between the user's mobile device and the print device to which the user wants to connect.

The details of some exemplary embodiments are set forth in the accompanying drawings and the description below. Other features, aspects, and potential advantages of the subject matter will become apparent from the description, the drawings, and the claims.

FIG. 1 illustrates a system 100 that includes, but is not limited to, a control server 104, a data repository 105 (also referred to herein as "database 105"), a network 103, a mobile device 101 (e.g., a mobile phone, a tablet, a laptop, a PDA etc.), and print device 102 (e.g., a printer).

In this embodiment, the mobile device 101 and the print device 102 communicate via one or more network 103, which may include one or more of near field communication, Bluetooth communication, a wired network, and a wireless network, and such networks may include a LAN, a WAN, a MAN or a PAN. Also, in some embodiments the devices communicate via other wired or wireless means.

The control server 104 includes one or more processors (e.g., CPUs, microprocessors) and one or more storage. The one or more processors operate to cause image recognition information, image configuration information, or image attribute information to be stored in the one or more data storages and manage the stored information therein. One or more processors access the image recognition information or image configuration information from one or more storage locations to provide information in response to a request from a print application that resides in the user's mobile device 101. The print application resides in the memory of a mobile device and allows a communication connection between a mobile device and print device via one or more network connections to use one or more print functionalities of a print device. The print functionalities may include one or more functions that a print device may provide.

The one or more image recognition processes may use well-known image recognition software, computer vision algorithms, or object detection algorithms. One or more image recognition processes may also use the process of image matching or feature matching with the pre-stored images of the objects and may determine the object within an image frame, for example a print device.

Further attribute information may include, but is not limited to, information associated with the print device, such as unique identifier including a model number of the device; a device ID encoded in the form of a barcode, QR code, or any alphanumeric number; an environment in which the print device is installed (e.g., location), etc. The process of providing attribute information may use an image matching model (e.g., an artificial neural network) that may be trained on images or descriptive data for each make/model/environment information/related attributes of the print device. Therefore, one or more processor in the control server 104, which are programmed to perform the image recognition, provide the attribute information concerning the object (e.g., a print device) as captured in the image frame by the mobile device 101.

Further configuration information concerning the object may include, but is not limited to, a Wi-Fi connection, a local network or internet connection over LAN or WAN, a Wi-Fi network name, encryption type, any passwords, print device IP address or domain name, login setting information (e.g., Active Directory domain, department ID), default print settings (e.g., duplex, color mode), or print policies (e.g., whether user is allowed to print color, duplex). It may be noted that in some embodiments one or more processors of the control server are configured to perform image recognition on one or more image frame of the captured object to determine network communication associated with the recognized device in the image frame. While, in some embodiments one or more processors in a control server are configured to perform image recognition on one or more image frames of the captured object to determine configuration information associated with the recognized device in the image frame. The process of providing configuration information may use an image feature matching model or a machine learning model (e.g., an artificial neural network) that may be trained on images and on associated configuration information for each image of the print device. Therefore, one or more processors in the control server 104 are programmed to perform the image recognition and provide the respective configuration information of the object as captured in the image frame by the mobile device. The details of an embodiment of image recognition using image feature matching and a machine learning model is further explained in FIG. 5.

It should be noted that in the present embodiment, the control server 104 is embodied as a server. However, the functionality performed by the control server 104 may be embodied as one or more applications configured to be provided in the cloud or on an application platform. The database repository 105 can be included as a part of the control server 104 or can be located remotely (e.g., a cloud) from the control server 104. The functionality of the control server 104 may also be embodied as an application executing locally on the mobile device.

The mobile device 101 may include, but is not limited to, a smartphone, a tablet, a portable computing device, a laptop, and the like. The functional details of various components embodied within an embodiment of a mobile device will be further explained in FIG. 2.

As shown in FIG. 1, the mobile device 101, the print device 102, at least one control server 104, and the database repository 105 are communicatively coupled with each other over a network 103. When the mobile device 101 captures an image or captures a series of images in a continuous video stream of a print device 102, the mobile device 101 communicates via the network 103 to access the control server 104 or the data storage 105 to determine whether the captured image of the particular print device 102 matches with one or more images of print devices that are pre-stored in the database repository 105 or in the control server 104. One or more processors in the control server 104 perform the image processing on one or more image frames of the captured image using an image recognition algorithm such that information related to the captured image frame is provided. The information related to a captured image frame may include identification information for a print device. For example, the identification information may include the "model number," the "Name," or environment information of the print device, which may be displayed on the display screen of the mobile device 101. The additional details and processes of some embodiments of image recognition and identification associated with FIG. 1 are further explained in detail in the following drawings and description.

In some embodiments, one or more processors or control programs of the mobile device communicate via the network 103 to access the control server 104 or the database repository 105 to determine whether one or more image frames of the captured object in an image frame match with the pre-stored image frame of the object, which includes environment information of the object.

Additionally, as shown in FIG. 1, a print application that resides in and executes on the mobile device 101 establishes and maintains a connection to the print device. In some embodiments, the print application establishes a direct Wi-Fi connection between a mobile device 101 and a print device 102. The print application of mobile device 101 communicates with the control server 104 and the database 105 via the network 103. In general, the mobile device 101 captures image of the print device 102 or any object within the field of view of the camera of the mobile device. The print application of the mobile device 101 then sends the captured image data to the control server 104. The control server 104 receives the image data, identifies the object captured in the image frame and the environment of the object, and provides configuration information of the identified object represented in the image data. The identification of the captured object, the environment information, and the configuration information are performed based on the pre-stored object information related to various devices supported by the print application. For example, one or more processors in the control server 104 are programmed to perform identification and recognition of the object captured in the image frame as the print device 102 and determine the environment information of the object, for example room ABC, building A, and configuration information based on the pre-stored print device configuration information related to the print device image. The configuration information may also include, for example, one or more of a print device ID, a print device network name, a domain name, login information, SSID, an IP address, a password, a print device policy, an access point, and a print device setting.

As mentioned above, one or more processors of the control server 104 identify the image data captured by a print application using various image matching techniques. One such technique may include identifying features of the device within an image frame. The features may include shape of the object as captured in an image frame, corner points, any text, a code (e.g., a barcode, a serial number, a logo, a QR code), any colors in the image data, etc. Another technique for image matching may include analyzing and matching the unique features of the image, for example, matching the contrast points to determine the transition of one color to another color in an image frame. The print application may use one or more image matching algorithms to perform the analysis of contrast points within an image frame and use one or more algorithms to determine the relative location, distance, and orientation of the object, for example as explained below. In some embodiments, the control server 104 comprises one or more processors and storage that store information related to an indicator pattern (e.g., a flashing LED pattern) emitted by the print device. In some embodiments, the visual indicator pattern is emitted via a display on a display screen of the print device 102. In some embodiments, the visual indicator pattern is emitted by a dedicated emitter or set of emitters that are caused to emit a visual indicator, such as one or more LED lights. The mobile device 101 may capture an image or a video of the visual indicator pattern, identify the meaning of the visual indicator pattern, and present information associated with the visual indicator pattern of the print device 102 on the display screen of the mobile device 101.

In some embodiments, the indicator pattern may include an audio indicator pattern indicated by an audio output device (e.g., one or more speakers) built within or externally attached to the print device 102. The audible indicator pattern may include, but is not limited to, an alarm or a beep sound. The microphone (which is an example of an audio I/O interface 101-12 in FIG. 2A) of the mobile device 101 may capture an audio indicator pattern while the mobile device 101 is capturing the image or the video of the print device 102. As mentioned above, the mobile device 101 can capture the audio indicator pattern, identify the meaning of the audio indicator pattern, and present information associated with the audio indicator pattern of the print device 102 on the display screen of the mobile device 101.

Therefore, sequences of visual indicators or audio indicators generated by the print device may be detected by a print application using a camera and a microphone of the mobile device, and the sequences of indicator patterns may be decoded by a print application in such a way as to provide a status confirmation to the user that the mobile device can communicate with the print device. The print application recognizes and decodes the meaning associated with the visual and audible indicator patterns to assure the user using the print application that the connection request between mobile device and print device is successful and the user can send the print job to the print device. Additional details with respect to the indicator patterns are further explained in other embodiments in this disclosure.

In other words, the one or more processors in the control server 104 perform matching and comparing of information from the visual indicator pattern (e.g., indicator color, indicator frequency) or the audible indicator pattern (e.g., sound type, volume) with the values of pre-stored visual indicator patterns and pre-stored audible indicator patterns and provide the corresponding meaning of the indicator patterns.

Figure 2A:
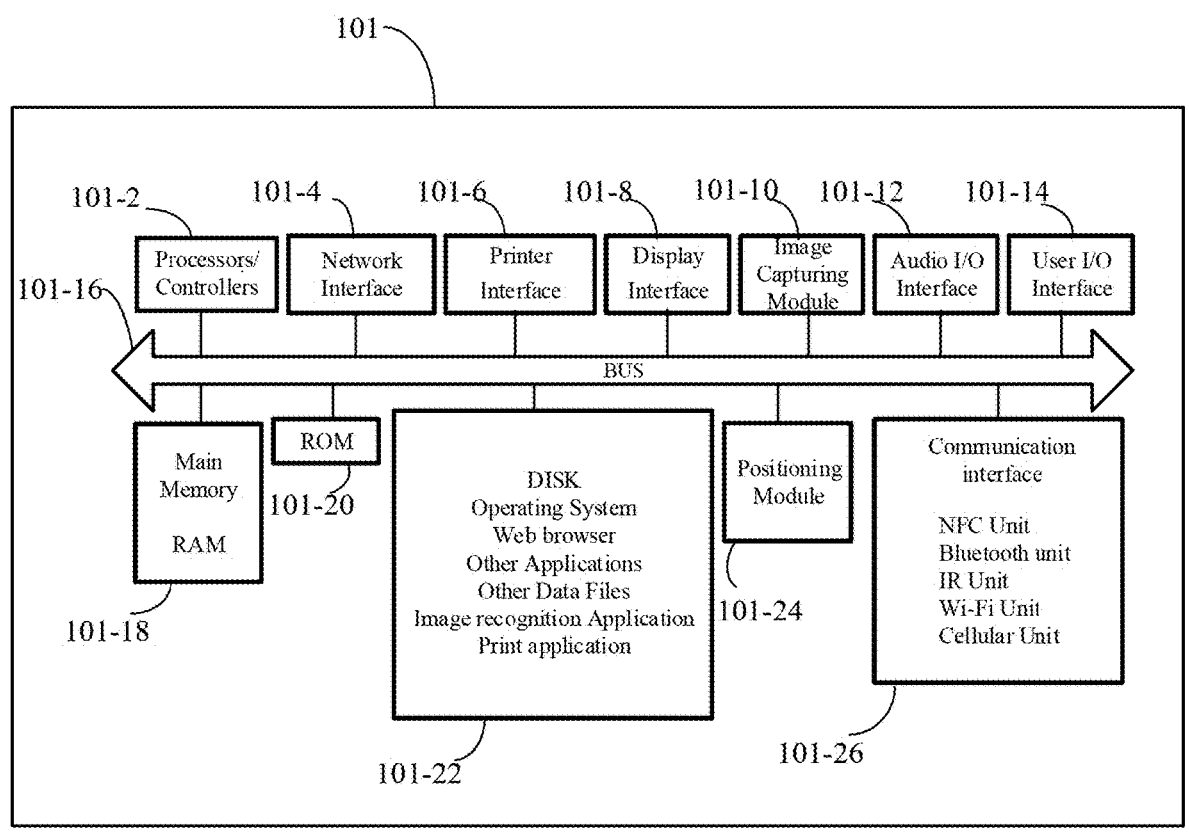
FIGS. 2A-2B illustrate an internal architecture of embodiments of a print device and a mobile device.

FIG. 2A illustrates an exemplary embodiment of an internal architecture of a mobile device 101 (e.g., a phone, a tablet) that implements the print application. The mobile device 101 includes one or more processors or controllers 101-2. The one or more processors or controllers 101-2 include one or more central processing units (CPUs), which include microprocessors (e.g., a single core microprocessor, a multi-core microprocessor) or other electronic circuitry. The one or more processors 101-2 are configured to read and perform computer-executable instructions, such as instructions that are stored in the read only memory (ROM) 101-20, the main memory 101-18, or the storage 101-22.

The device also includes I/O components. The I/O components include communication interfaces to input and output devices, which may include a keyboard, a display, a mouse, a print device, a touch screen, a light pen, an optical-storage device, a scanner, a microphone, a camera, a drive, a controller (e.g., a joystick, a control pad), and a network interface controller. In this embodiment of the mobile device 101, the I/O components include a printer interface 101-6, which enables the device to communicate with a local or remote printer; a network interface 101-4, which enables the device to communicate with a network; a display interface 101-8, which enables the device to communicate with a display device; and a user I/O interface 101-14, which enables the device to communicate with an input device (e.g., a touch screen, a keyboard, a mouse).

The ROM 101-20 stores invariant computer executable instructions for basic system functions, such as basic I/O or start-up. The main memory 101-18, which may include random access memory (RAM), provides the processors 101-2 with memory that can be accessed quickly.

The device further includes an image capture module 101-10 (e.g. a camera) that is configured to capture still and moving images.

A communication interface 101-26 is provided to perform control of communication using NFC, Bluetooth, infrared (IR) signals, IEEE802.11, and cellular signals. The communication interfaced 101-26 may include one or more of a NFC unit, a Bluetooth unit, an IR unit, a Wi-Fi unit and a cellular unit. The NFC unit performs short distance communication to enable bidirectional communication with a print device having NFC functionality. The NFC unit may include circuitry and software that enables transmission (writes) and reception (reads) of commands and data with a non-contact type device using a short distance wireless communication technique such ISO/IEC IS 18092. The Bluetooth unit provides short distance communication and may include a transceiver capable of transmitting and receiving data via short wavelength radio waves ranging in frequency between 2.4 GHz and 2.485 GHz. An IR unit is another mode of short distance communication that can emit and sense electromagnetic wavelengths of a predetermined frequency which have data encoded therein. The Wi-Fi unit provides another medium of communication that enables packetized communication via a communication network in compliance with IEEE802.11. The WIFI unit enables network communication with any of a LAN or WAN. The cellular unit includes hardware that is able to send and receive RF signals via a cellular network. The cellular unit facilitates signal transfer and hand-offs between various cellular communication towers no matter the position of the mobile device 101 to allow for consistent streamline voice and data communication between the mobile device 101 and other devices via a cellular network (not shown).

The mobile device 101 further includes positioning module 101-24, such as a global positioning system (GPS) unit, which obtains location information of the mobile device 101. For example, a mobile device 101 with a GPS receiver may determine its location and then communicate its location to a server. Alternatively, a sensor (e.g., RFID reader or other presence sensor) in the environment may detect the presence of the mobile device 101 and communicate location information identifying the location at which the mobile device 101 was detected to a server.

The device also includes a disk storage 101-22, also referred as storage. The storage 101-22 includes one or more computer-readable storage media. A computer-readable storage medium, in contrast to a mere transitory, propagating signal per se, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, RAM, SRAM, DRAM, ROM, EPROM, EEPROM). The storage 101-22 can store computer-readable data or computer-executable instructions.

The storage 101-22 includes an operating system, a web browser, other applications (e.g., word processing, spreadsheet, and graphics applications), and data files. The storage 101-22 further includes an image recognition application. In the storage 101-22, the image recognition application includes logic, computer-readable data, or computer-executable instructions. Also, the image recognition application in 101-22 may be implemented using software (e.g., Assembly, C, C++, C#, Java, BASIC, Perl, Visual Basic), hardware (e.g., customized circuitry), or a combination of software and hardware. In FIG. 2, the image recognition application in 101-22 includes instructions that, when executed, or circuits that, when activated, cause the mobile device 101 to implement the operations that are specified by the image recognition application. Also, the hardware components of the device communicate by means of one or more buses 101-16 or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

Figure 2B:
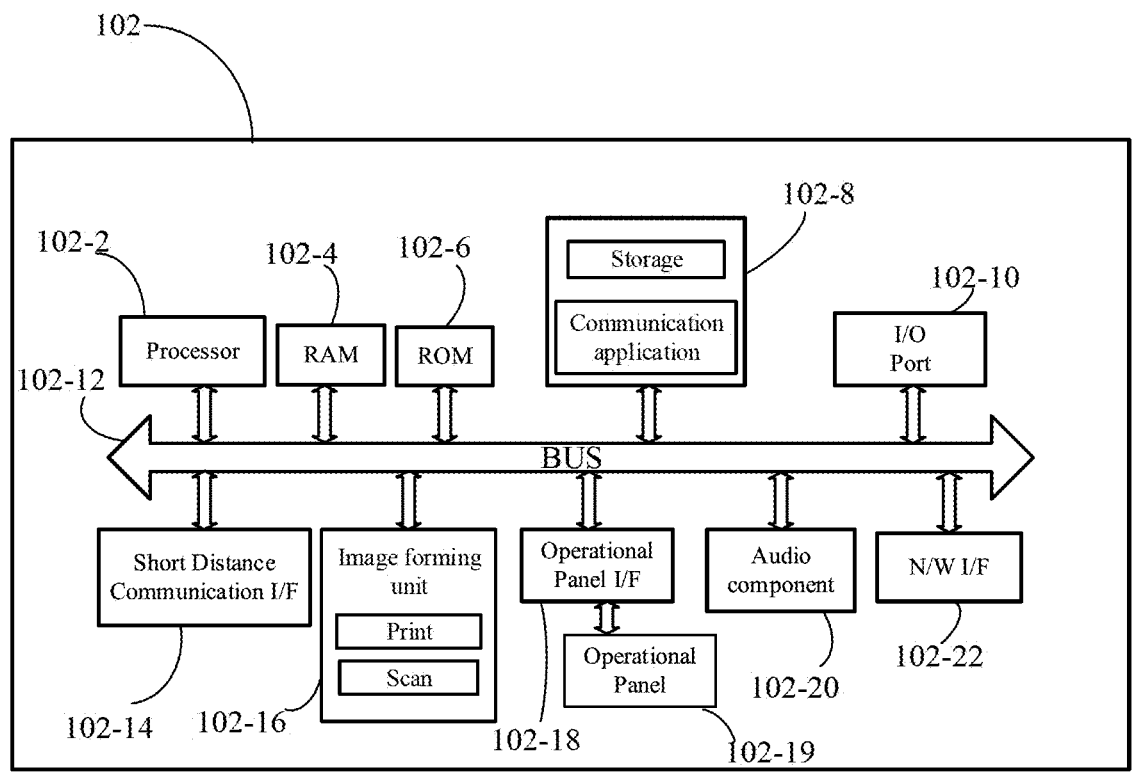

FIG. 2B illustrates an example embodiment of an internal architecture of a print device 102. Referring to FIG. 2B, the print device 102 includes a processor 102-2, a RAM (Random Access Memory) 102-4 for temporarily storing data, a ROM (Read Only Memory) 102-6 storing programs, constants and others, a storage unit 102-8 storing image data and other data, an I/O (input/output) port 102-10, a bus 102-12, a short distance communication interface 102-14, an image forming unit 102-16, an operational panel I/F 102-18, an audio component 102-20, and a network interface (N/W I/F) 102-22.

The print device 102 illustrated in FIG. 2B may be a multifunction peripheral having a scanning function in addition to printing, copying, and other functions. However, it will be understood that various other implementations of a print device are within the scope of the present disclosure. For example, various components, modules, functions, or configurations of the print device 102 of FIG. 2B could be combined, deleted, or modified to form further implementations.

The print device 102 performs one or more operations described herein. In some embodiments, the print device 102 provides functionality described herein, for example by software running on the print device 102 that causes the print device 102 to perform one or more operations described herein. In certain embodiments, applications that are executing on the print device 102 and that provide specific types of functionality are in bidirectional communication with at least one mobile device 101 via a communication protocol using a network I/F or a communication I/F.

The at least one processor 102-2 includes one or more central processing units (CPU) that perform overall control functions for the print device 102. The processor uses the random access memory (RAM) 102-4 as a work area while executing instructions. The processor executes instructions of various programs stored in one or more storage/memory devices 102-8. For example, the processor executes programs stored in a read only memory (ROM) 102-6 and in a storage device 102-8.

In some embodiments, the at least one processor 102-2 includes one or more processors in addition to, or in alternative to, a CPU. By way of example, the at least one processor 102-2 may include one or more general-purpose microprocessors, application-specific microprocessor (ASICs), or special purpose microprocessors. Additionally, in some embodiments the at least one processor 102-2 may include one or more internal caches for data or instructions.

The at least one processor 102-2 provides the processing capability required to execute an operating system, application programs, and various other functions provided on the print device 102. The processor 102-2 performs or causes components of the print device 102 to perform various operations and processes described herein, in accordance with instructions stored in one or more memory devices 102-8.

The RAM 102-4 is used as a work area when the processor 102-2 executes various instructions, such as those making up computer programs stored in the ROM 102-6 or in the storage device 102-8. The RAM 102-4 may be used as a temporary storage area for various data, including input image data, data created by an application executing on the print device 102, or data received from one or more mobile devices 101 (shown in FIG. 1), which is then further processed by one or more applications executing on the print device 102. The RAM 102-4 may be used as a cache memory. In some embodiments, the RAM 102-4 may be dynamic RAM (DRAM) or static RAM (SRAM).

The ROM 102-6 stores data and programs having computer-executable instructions for execution by the processor 102-2. In some embodiments, the ROM 102-6 includes a boot ROM, storing instructions for the booting process. In some embodiments, the ROM 102-6 includes a flash memory. In certain instances, the ROM 102-6 may include an operating system for controlling the operation of the print device 102. In this case, an operating system application stored in ROM 102-6 (or alternatively stored in the storage device 102-8 and accessible once the boot routine of the print device 102 is completed) contains a catalog of other applications executing on the print device and provides information about such other executing applications to one another, enabling interoperation there between.

A storage device 102-8 stores application data, program modules and other information. One or more program modules stored in the storage device 102-8 are configured to cause various operations and processes described herein to be executed. The storage device 102-8 also stores other programs and data to be processed. For example, the storage device 102-8 stores an operating system including programs and data for managing hardware and software components of the print device 102. Applications on the print device 102 may utilize the operating system to perform various operations. The storage device 102-8 may further store other programs or drivers that enable various functions of the print device 102, graphical user interface (GUI) functions, or processor functions. The storage device 102-8 may also store data files including, for example, image data; image data configuration information; user data; GUI components, such as graphical elements or templates; or other data required by the print device 102 or the mobile device.

In some embodiments, the print device 102 includes one or more applications using one or more programs for controlling access to one or more resources on the print device 102. In some embodiments, applications stored in the storage device 102-8 includes one or more programs for controlling access to one or more applications (or particular functionality thereof) executing on the print device 102 or mobile device.

In some embodiments, access to one or more resources of the application is controlled based on a credential associated with the user attempting to access the one or more resources of the application. Policies for controlling access to various resources of the application may be stored at the print device 102. In other embodiments, access control policies may reside in a centralized or enterprise server remotely located from the print device 102. Once access to an application is granted, a user gains access to one or more resources of the application, including task-specific functionality of the application. The task-specific functionality of the application may enable the user to perform one or more tasks using the application. For example, the application may provide various functions, features, and user interfaces for processing image data, transmitting data over a network, managing one or more databases, or other tasks. In some embodiments, the application is configured to use one or more resources of the print device 102 to perform a process in response to an instruction from the user.

An application executing on print device 102 may use the functionality of and/or information on the print device 102 to employ hardware, software, or both for that provides scanning functionality. For example, the print device 102 may include an image sensor or a camera for capturing an image.

In certain embodiments, the application executing on the print device 102 provides communication functionality for transmitting image files (or other electronic document data file format) via the network to any other computing system and/or server connected thereto. The communication functionality of the application may be implemented by interaction with the network interface 102-22, which converts data into a transmissible data form able to be communicated over a network to a server (or other computing system). In addition to, or instead of using the network interface 102-22, application functionality that requires transmission of data may be performed using the short distance communication interface 102-14 (including any and all types of short distance communication described herein). The receipt of data from the server or other computing device may similarly occur using any of the network interface 102-22, short distance communication interface 102-14 or the like.

In some embodiments, the application executing on the print device 102 provides functionality for maintaining and accessing information in a data structure, which may be any suitable data structure for organizing data. For example, information associated with a user or information associated with the print device 102 may be added as one or more entries into a data structure. The application executing on the print device 102 may store and/or retrieve data in a memory or on a hard disk of the print device 102. In some embodiments, the print device 102, when executing the application, may perform various operations with respect to a data store. Examples of operations include adding entries to a data store, deleting entries from a data store, modifying entries in a data store, searching for entries in a data store, and retrieving entries from a data store. The data storage functionality provided by application discussed above is also applicable to data stores located on remote computing systems and/or servers connected to the print device 102 via the network.

The application executing on the print device 102 may provide functionality for generating information and providing the information to a user interface of the print device displayed on operational panel 102-19 via the operational panel interface 102-18. The information may include text, images, audio or visual data information, form elements, files, executable programs, or other suitable information.

In some embodiments, the storage device 102-8 stores a communication application that generates a form data object representative of a user interface generated by and displayed on a display screen of the print device. The communication application communicates the form data object to at least one mobile device via a communication protocol (e.g., short distance communication protocol, network communication), which can enable the user interface of the print device to be mirrored on a display of the mobile device. As such, a form will be presented on the display of the mobile device, with a user fillable form that will receive input data from the user via one or more user input mechanisms of the mobile device. The communication application executing on the print device 102 receives a return data object from the mobile device that includes a plurality of data values corresponding to the input requested in the form data object for use by one or more other applications executing on the print device 102. In some embodiments, the application resides on the storage device 102-8 and executes on the print device 102. In this manner, the communication application advantageously improves the functionality of print device 102 by providing an enhanced manner for a user to interact with and control the print device 102. More specifically, by exporting data representing a form data object resulting in the automatic generation of a fillable form on a mobile device, the communication application enables the print device 102 to operate in a manner that was heretofore unable to operate. And the mirroring of the display screen provides the user with the ability to use a more familiar mechanism or device for entering information about a processing job to be executed by the print device 102. For example, when a user wishes to complete a scan job or a print job, there may be some additional data describing various aspects of the job data, and the user may advantageously enter such data using the mobile device. Moreover, the mirroring functionality advantageously reduces the time and effort needed to enter the data because, by automatically displaying the user interface on the mobile device, the communication application allows the user to leverage the capabilities of the mobile device for the purpose of entering data describing a job to be executed by the print device. A further advantage associated with the communication application is that the print device 102 may receive specific types of data as input data values that originate on a mobile device but which the print device 102 was unable to previously access or obtain. As such, the form data object advantageously interacts with an operating system of the mobile device to identify particular applications executing thereon that could provide the specific types of data requested in the form data object and enable to user to activate a respective one of the identified applications to acquire the specific type of data, which is then provided back to the user as the return data object. In this manner, the communication application allows the print device to receive, as input data values, types of data that it would otherwise not be able to receive.

The communication application executed by the one or more processors 102-2 of print device 102 may include at least one program that, when executed by one or more processors 102-2, cause the one or more processors to perform one or more operations described herein.

The print device 102 includes one or more input/output (I/O) port(s) 102-10. The I/O port(s) 102-10 may include any suitable interface type, such as a universal serial bus (USB) port, FireWire port (IEEE-1394), serial port, parallel port, or AC/DC power connection port. The I/O port(s) 102-10 enable one or more external device(s) to communicate with the print device 102 when the external device(s) is/are connected to the I/O port(s) 102-10.

A system bus 102-12 interconnects various components of the print device 102 thereby enabling the transmission of data and execution of various processes. The system bus 102-12 may include one or more types of bus structures including a memory bus or memory controller, a peripheral bus, and a local bus using any of a variety of bus architectures.

The print device 102 may also include a short distance communication interface (I/F) 102-14. The short distance communication interface 102-14 facilitates communication between one or more applications executing on the print device 102 and at least one mobile device using one or more short distance communication protocols. Thus, the short distance communication interface 102-14 may include a near field communication (for example, an NFC reader) enabling bidirectional communication with a mobile device having NFC functionality. The NFC communication may use circuitry and software that enables transmission (writes) and reception (reads) of commands and data with a non-contact type device using a short distance wireless communication technique (e.g., ISO/IEC IS 18092). In some embodiments, the short distance communication interface 102-14 may also implement Bluetooth communication (e.g., Bluetooth low energy communication) that includes a transceiver capable of transmitting and receiving data via short wavelength radio waves ranging in frequency between 2.4 GHz and 2.485 GHz. In some embodiments, the short distance communication interface 102-14 may also include an IR unit that can emit and sense electromagnetic wavelengths of a predetermined frequency have data encoded therein. Furthermore, while not specifically shown, the short distance communication interface may also include a smart card reader, a radio-frequency identification (RFID) reader, a device for detecting biometric information, a keyboard, a keypad, sensor(s), a combination of two or more of these, or other suitable devices. In some embodiments, the short distance communication interface 102-14 includes an optical scanner configured to capture and scan image data representative of an identification code, such as a barcode (e.g., a one-dimensional barcode, a two-dimensional barcode). In these embodiments, the capture and processing of a particular identification code may initiate the short distance communication between the mobile device and the print device 102.

The depiction of the short distance communication interface 102-14 is done merely to facilitate the understanding of the operation of the present arrangement and it should be understood that the short distance communication interface 102-14 may also be embodied as part of the I/O interface 102-10 and/or the network interface 102-22.

The image forming unit 102-16 may include a scan unit and a print unit. The device interface performs synchronous/asynchronous conversion of image data.

The scanner unit includes a light source and an image sensor. The scanner unit may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit includes an optical system (e.g., mirrors, lens) that directs the light to the image sensor. After the image sensor generates the electrical signals, an analog-to-digital converter converts the electrical signals to digital image data representing the scanned physical document. The scanner unit then outputs the digital image data to one or more other components of the print device 102 via the device interface.

The print unit is an image output device for printing on a sheet an image corresponding to image data. In response to a print command received at the print device 102, the print unit receives image data via the device interface and outputs to a sheet an image corresponding to the image data.

An operational panel interface 102-18 of the operational panel 102-19 provides output signals to and receives input signals from an operational panel. Regarding the output signals, the operational panel interface 102-18 provides GUI data to the operational panel for display on a display device, such as liquid crystal display (LCD) or a light emitting diode display (LED). Regarding the input signals, the operational panel interface 102-18 receives input signals based on user input operations at the operational panel 102-19 and relays the input signals to the processor(s) 102-2. In some embodiments, the operational panel interface 102-18 includes a touch sensitive element operable to receive user input operations or commands based on the touching of graphical objects displayed on the display. In some embodiments, the operational panel interface 102-18 includes a hard key panel.

In some embodiments, print device may include an audio component 102-20, which may be an inbuilt speaker or externally coupled speaker. The audio component 102-20 may be a dedicated processing unit, such as a specialized processing block or a digital signal processor or other processor. The audio component 102-20 may also have pre-loaded audio patterns, which can be stored in the storage 102-8 and can be accessed via one or more processor by audio component. The one or more processors used in the audio component 102-20 analyze and compare the data information received via mobile device with the pre-stored data information related to audio print patterns stored in storage 102-8 and translate the analyzed information into audio signal, such as a beep, an alarm, or another audio sound message. In one or more embodiments, the audio signal may be synchronized with a flashing LED light using one or more software algorithms stored in memory storage 100-8 and thereby may be displayed as a flashing LED light pattern on the operational panel interface 102-18 of print device 102.

A network interface 102-22 includes hardware, software, or both providing one or more interfaces for communication (such as, for example, packet-based communication) between the print device 102 and one or more other servers or one or more networks 102-22. As an example, and not by way of limitation, the network interface 118 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable network interface for it. As an example, and not by way of limitation, the print device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the print device 200 may communicate with a wireless PAN (WPAN)

(such as, for example, a BLUETOOTH WPAN), a WI-FI network, a WI-MAX network, or other suitable wireless network or a combination of two or more of these. The print device 200 may include any suitable network interface 102-22 for any of these networks, where appropriate.

In some embodiments, the print device 102 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the print device 102. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

FIGS. 3A-3D shows a system diagram of implementing a print application residing in a mobile device or in a tablet that communicates with print device. In particular, FIG. 3A illustrates an architecture representing the operational setup of a mobile device 301 and a print device 302, and FIG. 3B-FIG. 3D show the operational process using the print application.

As shown in FIG. 3A, the mobile device 301 has a display screen 303, and a print application resides within the memory storage (101-22, FIG. 2A) of the mobile device 301. Once a user operates the mobile device 301 and activates the print application, for example by selecting an image element representing the print application icon (not shown) shown on the display screen 303, the print application dynamically activates the camera of the mobile device 301. The user can point the camera of the mobile device to capture one or more images or a stream of images as a video, of the devices available within an environment or within the field of view of the mobile device's camera.

In one of the exemplary embodiments, once the print application has been activated, the print application displays instructions as a text or as an image on the display screen 303 to activate the camera of the mobile device and point the camera of the mobile device towards the print device 302. Thereafter, the print application causes the display screen 303 to display the images of various objects within the camera view of the mobile device 301. As the stream of images is captured by the mobile device camera, the image recognition process of the print application starts recognizing various objects within the images. In this particular exemplary embodiment, the print device 302 as shown in FIG. 3A-3D, is considered by the mobile device's camera. Once the print application detects the print device 302 in the image frame and displays an image of the print device 302 on the display screen 303, the print application determines the configuration information of the print device 302 in the image frame and initiates a connection request in order to perform a communication connection (e.g., Wi-Fi internet connection) with the print device 302.

In certain embodiments, the Wi-Fi internet connection may include a communication connection over a network using a Wi-Fi Direct connection or an infrastructure Wi-Fi connection using a LAN or a WAN. However, performing the communication connection is not limited to Wi-Fi and may include one or more wired or other wireless communication media as well, such as near field communication, a Bluetooth communication, and/or packet-based communication via a wired network or a wireless network using a LAN, a WAN, a MAN and/or a PAN.

In one of the embodiments, a communication connection referenced in this disclosure is an infrastructure Wi-Fi connection communication over a LAN or a WAN, in which various devices (e.g., a print device and a mobile device) communicate with each other through a router or central access point, which allows the mobile device 301 and the print device 302 to initiate communication connection with the help of the print application. However, the communication connection is not limited to an infrastructure Wi-Fi connection and can use a wireless ad-hoc network connection (e.g., near field communication, Wi-Fi direct communication, Bluetooth communication) and/or packet-based communication as well.

As shown in FIG. 3A, the camera of the mobile device 301 as operated by the user, is aimed at, or pointed in the direction of, the print device 302, which is within the field of view of the camera. The mobile device 301 may capture an image or capture a series of images in a continuous video stream of the print device 302. These images may be displayed on the display screen 303 and, the print application then performs the operations of image detection (shown in FIG. 3B), image recognition (shown in FIG. 3C), and determining a network communication including configuration information to be used to establish a network communication connection between the mobile device 301 and the print device 302 (shown in FIG. 3D).

FIG. 3B shows an example embodiment illustrating the detection of a captured image within an image frame using the print application.

In FIG. 3B, once the user operates the mobile device 301 to start the print application, the print application provides instructions (textual or image based) on the display screen 303 of the mobile device 301. The user follows the instructions (textual or image based), and the print application starts the image capture process to capture the still or video images of the print device using the mobile device camera. The print application detects information contained in the pixels of the image frame and determines the identity of the captured print device within the image frame. The process of detecting the image frame is performed by an image detection algorithm stored in the memory storage of the mobile device or by a remote server. The process of image detection includes, but is not limited to, detecting, decoding, and identifying the images within an image frame based on the symbols which may appear on the object (print device in this case), such as alphanumeric characters, barcodes, a shape of an object, a color of an object, corner points of an object, etc. The image detection algorithm detects and recognizes the image of the print device by analyzing the image frame captured by the mobile device 301 and comparing the results to image frames stored in the database 105 (FIG. 1) or server 104 (FIG. 1), and thereby recognizes the print device 302 if a representation of the print device 302 is matched with the image frame as stored in the database 105 (FIG. 1) or server 104. Therefore, as shown in FIG. 3B the mobile device 301 accordingly shows on the display screen 303 a "print device" as detected by the print application.

FIG. 3C shows an exemplary embodiment illustrating recognition information of an image as detected in the image frame using the print application. Once the print application detects the print device within an image frame, the print application performs the next operation as shown in FIG. 3C. The print application recognizes the information related to the detected print device as shown in FIG. 3B. As shown on the display screen 301 of FIG. 3C, once the print application detects the device as a print device, the print application recognizes characteristic information of the print device, such as print device ID, model number, environment information (e.g., location) of the print device, a password to connect the communication Network (e.g., Wi-Fi), SSID information, a MAC address, a serial number of the print device, a domain name, a print device policy, a print device setting, etc. The process of recognizing the print device information (e.g., characteristic information) may be performed by an image recognition or an image classification process (e.g., neural network) and storing the related image information of each print device in the control server 104 (FIG. 1) or database repository 105 (FIG. 1). Therefore, the print application in FIG. 3C utilizes the image recognition information and identifies the characteristic information of the print device. For example, as shown in FIG. 3C the print device is identified as print device name as "PIXMA 2451", with environment (e.g., location) information as "Room ABC, building A".

Moving on to FIG. 3D, the print application automatically identifies available configuration information that may correspond to the recognized print device name and recognized environment name from the image frame. For example, the print application matches the characteristics of the image recognition information of the print device with the pre-stored network configuration information, and the print application can accordingly automatically initiate the connection request with the print device to establish a Wi-Fi network connection (e.g., infrastructure Wi-Fi or ad-hoc Wi-Fi network connection) and load the configuration setting information of the print device to the mobile device 301. This assures that the print device detected the mobile device is the one connected at the network, and the user accordingly starts transmitting the print job to the preferred print device identified by the print application. The additional details of various other methods and features to initiate the communication connection between a mobile device and print device are further explained in details with the help of system diagrams and flow charts below.

FIGS. 4A-4D shows some embodiments of a system diagram of implementing a print application residing on user's mobile device or in tablet to communicate with print device. In particular, FIG. 4A illustrates an architecture representing the operational setup of the mobile device 301 and the print device 302, and FIG. 4B-FIG. 4D show the operational process for establishing network communication between the mobile device and the print device using the print application.

The operational process followed in FIG. 4A and FIG. 4B remains the same as in FIG. 3A and FIG. 3B. In FIG. 4C, upon detecting the print device within an image frame from FIG. 4B, the print application performs the next operation, as shown in FIG. 4C. The print application recognizes the information related to the detected print device as shown in FIG. 4B. As shown on display screen 303 of FIG. 4C, once the print application detects the device as a print device the print application recognizes characteristic information of the print device. The process of recognizing the print device information (e.g., characteristic information) may be performed by an image recognition or an image classification process (e.g., a process that uses a neural network) and storing the related image information of each print device in the control server 104 (FIG. 1) or database repository 105 (FIG. 1). The print application in FIG. 4C utilizes the image recognition information and identifies the print device ID, the model number, SSID information, the MAC address, or the serial number of the print device that was captured in the image frame shown on the display screen 303. For example, as shown in FIG. 4C, the print device is identified as print device model number "PIXMA 2451". It is to be noted that the difference in FIG. 4C and FIG. 3C is that the image recognition performed in FIG. 4C is to determine the print device ID, the model number, the SSID information, the MAC address, or the serial number in the image frame, whereas in FIG. 3C the image recognition is performed to determine the environment information.

Moving on to FIG. 4D, the print application automatically searches available networks for network identifiers (e.g., MAC address information, serial number information, SSID information) that may correspond to the recognized print device ID, model number, or any other characteristic information of the print device. For example, once the print application detects a communication network having matching characteristic information of the print device with the network ID, the print application can accordingly automatically initiate the connection request with the print device to establish a network connection. This assures that the print device detected by the mobile device is the one connected at the network, and the user accordingly starts transmitting the print job to the preferred print device. The additional details of various methods and features are further explained below.

Exemplary embodiments of the operational process and details of the print application for establishing the network communication between a mobile device and a print device as shown in FIG. 3 and FIG. 4 are further explained in FIG. 5-FIG. 17. For example, the operational process for print application to determine the configuration settings of a print device associated within a particular print device environment is explained in FIG. 5-FIG. 10. Whereas the operational process for the print application to determine the configuration settings including the attribute information of a print device to establish the communication network between a print device and mobile device is explained in FIG. 11-FIG. 17.

Figure 5:
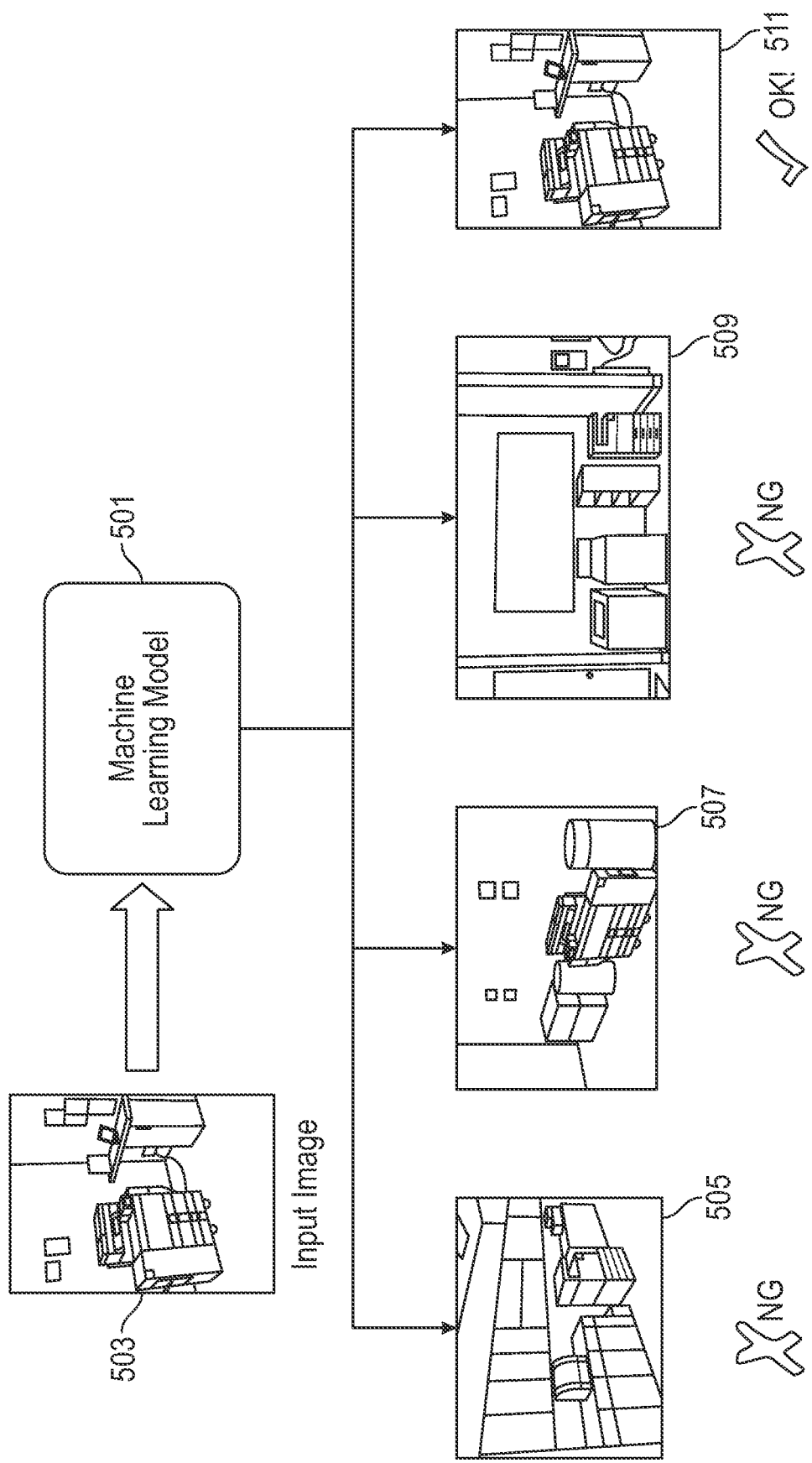
FIG. 5 illustrates an exemplary embodiment of a system performing the image recognition process in a print application according to embodiments of the present disclosure.

FIG. 5 illustrates an embodiment of a process of image recognition using one or more machine learning algorithms. The image recognition process in a print application may also implement other machine learning models (e.g., an artificial neural network) or follow a process of training the recognized images using various other algorithms.

As shown in FIG. 5, a machine learning model 501 is trained on the various image frames of a print device, such as frames 505, 507, 509, and 511. The training data may include images of particular print devices alone or images of print devices in their surrounding environment (e.g., location) indicating where the print devices are located. Associated with each image of training data is the configuration information associated with the print device in the image frame. The training data for image recognition may use a machine learning model, image template matching, or 3-dimensional object scanning algorithms to detect various features on the captured images. Detected features include, but are not limited to, one or more characteristics of the captured image such as shape, color, corner points, points of contrast or various other characteristics that may uniquely identify the device in the captured image. The detection of features may be performed on the captured image or feature matching algorithm or similar object detection methods or any known computer vision algorithms. The training data associated with each image frame may include attribute information, such as print device ID, model number, environment (e.g., location) of the print device, and configuration information. Configuration information may include a password to connect to the communication Network, SSID information, a MAC address, or a serial number of the print device, as well as a domain name, a print device policy, or a print device setting. The training data associated with the image frame is pre-stored in one or more database repository 105 or at server 104 and is accessed by the mobile device using print application via network 103.

As can be seen in FIG. 5, the machine learning model 501 is trained on various image frames, such as frames 505, 507, 509 and 511, and on associated configuration information associated with the image frames. When a user operates the mobile device to start the print application, and the print application starts an image capture process to capture the still or video images of the print device using a mobile device's camera. The print application detects information contained in the pixels of the image frame and determines an identity of the captured print device within an image frame using image detection and an image recognition algorithm stored in the memory storage of the mobile device or at remote server. For example, upon detecting the print device in the image frame, the one or more image matching algorithms match the information associated with the captured image frame with the pre-stored information of the image frame pre-stored at the control server 104 (FIG. 1) or database repository 105 (FIG. 1). In case the print application determines the detected image frame as frame 503, the machine learning model, using one or more machine learning algorithm, matches the image frame 503 with the pre-stored information of image frames 505, 507, 509, and 511, which may be stored at the server 104 (FIG. 1) or database repository 105 (FIG. 1), and determines at least one image frame among frames 505, 507, 509, and 511 that matches the image frame 503. For example, the image recognition process of the print application may determine that the image frames 505, 507, and 509 are not a good (NG) match with the captured image frame 503 and determine that image frame 511 matches (OK) the image frame 503.

The print application, using one or more image recognition or image matching algorithms, determines whether the configuration information associated with the captured image frame 503 that matches with the pre-stored image frame 51, already exists and is available to the print application of the mobile device. The recognition and determination of the configuration information associated with the captured image frame 503 of the mobile device is pre-stored based on the usage history of the user's mobile device. The further details of storing the configuration information and accessing the pre-stored configuration information associated with the image frame of the print device using the print application and associated with the user's usage history is further explained below.

Figure 6:
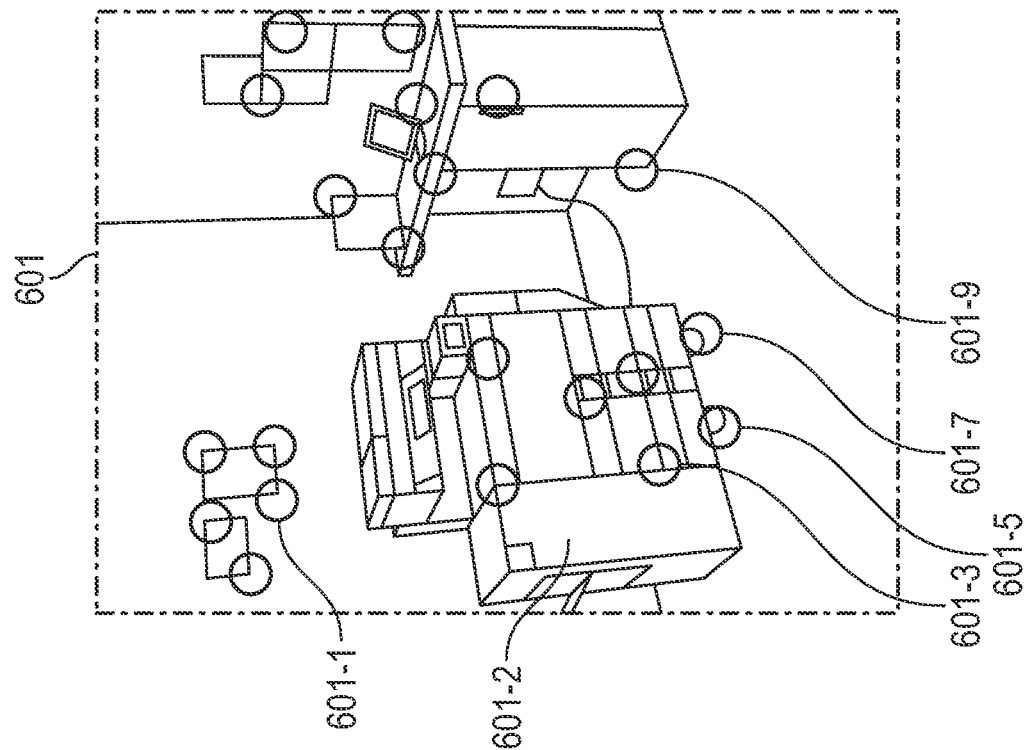
FIG. 6 illustrates another exemplary embodiment of a system performing the image recognition process in a print application according to embodiments of the present disclosure.
Figure 6:
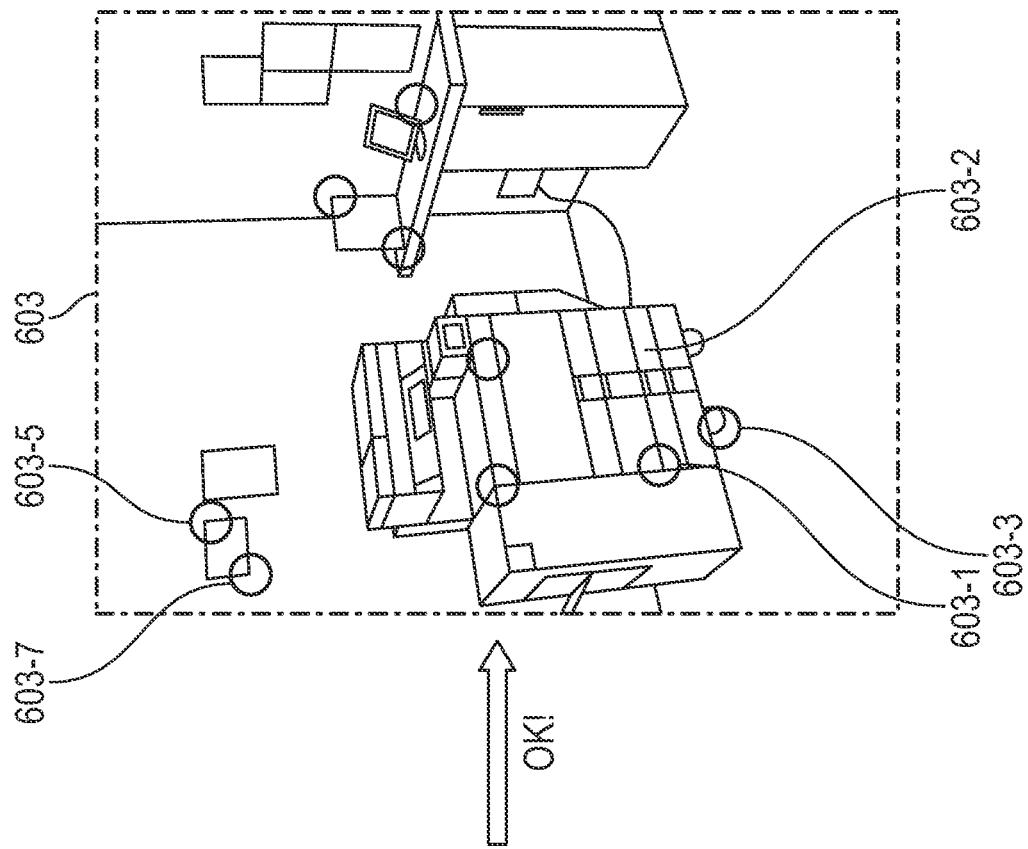

FIG. 6 illustrates another exemplary process used in image recognition using one or more image feature match algorithms, according to some embodiments. The image feature match is one of the algorithms, among various other object detection and recognition algorithms, which is used by the print application for recognizing the print device, an environment associated with the print device, and configuration information associated with the print device in an image frame.

FIG. 6 includes an image frame 601 and an image frame 603 to show an example of image recognition process using image feature match processing. In the image feature match, the image information for each image frame is analyzed to examine the unique characteristics, such as contrast information (e.g., variation of one color from other), pixel information, etc. The relative location, distance, and orientation of each object in the image frame is determined from these unique characteristics using one or more image analysis algorithm. The image recognition software of a print application may use one or more image feature match algorithms to recognize the print device, an associated environment of the print device, and the configuration information associated with the print device in the image frame. For example, a print application using one or more image feature matching algorithms may recognize the print device as "print device ABC 123" in the image frame, determine the print device environment information as "Room 123, Building A" and determine the one or more configuration information such as print device ID or model number or location of print device or password to connect the communication network or SSID information or MAC address or serial number of the print device or domain name or print device policy or print device setting etc. to initiate the network connection between mobile device and print device.

As seen in FIG. 6, a print application using an image feature algorithm in the image recognition process extracts information related to not only a print device but also information related to surrounding environment (e.g., shown as circles in frame 601 and 603) of the print device. The environment information of the print device 601-2 in image frame 601 is shown in circles for example, 601-3, 601-5, 601-7, and 601-9. The information of the print device (601-2), information of surrounding environment (e.g., 601-1, 601-3, 601-5, 601-7, 601-9) of the print device and configuration information (e.g., print device ID or model number or location of print device or password to connect the communication network or SSID information or MAC address or serial number of the print device or domain name or print device policy or print device setting) associated with the information of the print device and surrounding environment of the print device is pre-stored at the server 104 (FIG. 1) or in one or more database repository 105 (FIG. 1) by using the image feature match algorithm and can accordingly be accessed using one or more program of print application with the help of network connection 103 (FIG. 1). When the print application captures one or more image frames of the object (e.g., print device), the image recognition algorithm performs the image feature matching process to identify the captured object in the image frame, the environment of the object in the image frame and the associated configuration information of the object in the image frame.

As shown in FIG. 6, the print application captures the image frame 603 and during the image recognition process by using one or more image feature matching algorithm, the print application compares the features of image frame 603 with the pre-stored similar image frame features pre-stored at the server 104 (FIG. 1) or database repository 105 (FIG. 1). The image feature matching algorithm utilizes a comparison score process to compare the features of image frame against the pre-set threshold value of similar image frame. An image frame having the score above or equal to the acceptable value matching the pre-set threshold value of the similar image frame will be processed to the next step.

Based on the acceptable score value of the image frame 603, the print application determines whether the print device 603-2 captured in the image frame 603 is available for the configuration information, and is ready to proceed to the next operation. For example, if print application determines that the captured image frame 603 of the print device 603-2 and the image of the print device 603-2 as pre-stored in the storage repository provides a comparison score equal or above a certain threshold (e.g., above 50 percent) value, the print application determines that the print device as supported by the print application, is ready for the configuration information and can start the communication process with the mobile device.

In some embodiments, the print application determines whether the configuration information related to the print application and the print device as captured and recognized in the image frame has been connected in the past, and whether such a configuration information is pre-stored at the server 104 (FIG. 1) or in database repository 105 (FIG. 1). In case the print application determines that the mobile device has configuration information associated with the print device 603 is connected is the past and such a configuration information is pre-stored, the print application automatically starts the communication process between the print device 603 and the print application residing in the mobile device. However, in case the print application does not find the configuration information related to print application residing in the user's mobile device and the print device 603 as captured and recognized in the image frame of the mobile device, the print application loads the configuration information in order to proceed with the next operational process of setting the communication process between mobile device and print device. More details on the process of image recognition and loading the configuration setting and initiating the communication connection between the print device and mobile device can further be explained in this disclosure with the help of operational processes and diagrams.

Figure 7:
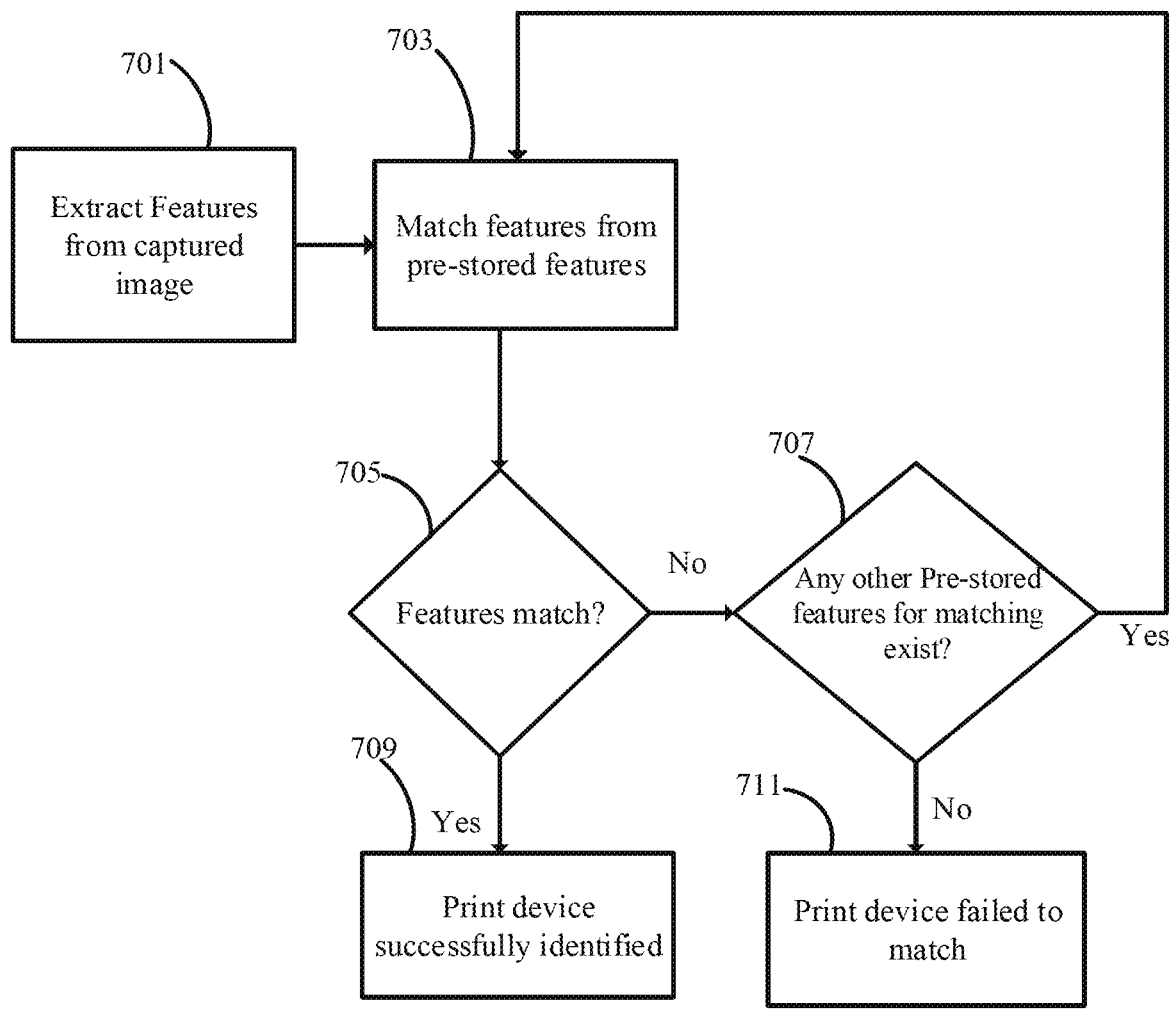
FIG. 7 illustrates an exemplary embodiment of a method of image recognition of determining configuration information using a print application.

FIG. 7 illustrates an example embodiment of an operational process for using a print application. In particular, the operational process in FIG. 7 illustrates the process of image recognition to identify the configuration information using a machine learning algorithm and/or an image feature match algorithm.

The operational flow in FIG. 7 is similar to the operational flows described in FIG. 5 and FIG. 6, and therefore some of the redundant details in FIG. 5 and FIG. 6 are not provided here. As explained in FIG. 5 and FIG. 6, once the print application captures an image frame of the print device, the image recognition process using one or more machine learning algorithms and/or image feature match algorithms extracts the various image features in block 701. The features may include variation in color such as contrast information (e.g., variation of one color from other) and/or pixel information. The print application matches or compares, in block 703, to determine whether the extracted features of the captured image in block 701 match with the information of the image frames features of the print device pre-stored at the server 104 (FIG. 1) or database repository 105 (FIG. 1).

The operational flow then moves to block 705. In block 705 the print application determines whether the image feature match of the print device captured in the image frame and the image frames of print devices pre-stored at the server 104 (FIG. 1) and/or database repository 105 (FIG. 1) exists. The details on how an embodiment of the image feature match is performed are provided in the description of FIG. 5 and FIG. 6. Upon determining the response as "Yes" in block 705 (i.e., the print application determines that the features of the print device captured in the image frame of the mobile device as displayed on the display screen match with the features of the pre-stored image frames of the print device), the process proceeds to block 709.

In block 709, the print application determines that the print device captured in the image frame of the mobile device matches with the information of the image frame of the print device pre-stored at the server 104 (FIG. 1) and/or the database repository 105 (FIG. 1) and that the configuration information associated with the print device captured in the image frame of the mobile device exists at the server 104 and/or the database repository 105 (FIG. 1). The print application obtains the configuration of the printer and configures the mobile device to establish the communication connection.

In case the response from block 705 is "No" (i.e., the print application does not recognize information of the features of the print device captured in the image frame of the mobile device with the information the image frames of the print device pre-stored at the server 104 (FIG. 1) and/or database repository 105 (FIG. 1)), the print application follows the process in block 707 to determine if the image feature of the print device captured in the image frame of the mobile device matches with the information of another pre-stored image frame of the print device stored at the server 104 (FIG. 1) and/or database repository 105 (FIG. 1), however the configuration information associated to the print device captured in the image frame does not match with the configuration information of the print device pre-stored stored at the server 104 (FIG. 1) and/or database repository 105 (FIG. 1). Block 707 is an example of a scenario where a print device having similar model number or device ID may be available in different environments. For example, the print device with print device ID "Pixma 123" may be available at "Room 123, Building A" and a print device with print device ID "Pixma 123" may also be available at "Lobby, Building A". In such a scenario, the print application uses an image recognition process to determine that the image features of the print device captured in the image frame match with the image feature of the pre-stored image frame of the print device and the configuration setting is available for the user to install in the print device ("yes" in block 707). This is a scenario where multiple print devices of similar model (e.g., Pixma 123) are available at different locations (e.g., "Room 123, Building A", "Lobby, Building A") and the print application residing in the user's mobile device associated with the one of the print devices (Pixma 123) located at one location (Room 123, Building A) in the past and did not associate with the another similar print device (e.g., Pixma 123) located at other location (e.g., Lobby, Building A) in the past. In such a case, the configuration information will be available for the user to load in the user's mobile device. Therefore, the print application matches the image features of the captured print device in the image frame of the mobile device with the pre-stored image features of the image frame of the print device stored at the server and or database repository and provides the configuration information to follow the flow ("Yes" in block 707) to block 703. The print application confirms the configuration information matches with the image feature of the print device captured in the image frame of the mobile device and the configuration information pre-stored at the sever in block 705, and the mobile device and the print device are successfully configured in block 709. Once the print application loads the configuration information to the mobile device, the print application imitates the communication between the mobile device and the print device.

In some embodiments, the print application may recognize the print device in the image frame captured by the mobile device using the print application and may match the features of the image frame to provide the print device ID and/or name. The user may manually enter the configuration information associated with the print device ID recognized in the image frame of the mobile device. The user may additionally make the configuration information associated with the print device captured in the image frame using the print application available at the network, cloud storage, a server, or in one or more database repository for the print application or another user using the print application to connect the mobile device with the print device for future use. The further details on manually saving the configuration information associated with the print device recognized in the image frame of the mobile device is further explained below.

If the process flow moves to block 711 (No in 707) the print application determines that the print application did not recognize the features of the print device captured in the image frame of the mobile device with the image information of print devices pre-stored at the server 104 (FIG. 1) and/or database repository 105 (FIG. 1) and returns a failure response in 711.

Figure 8:
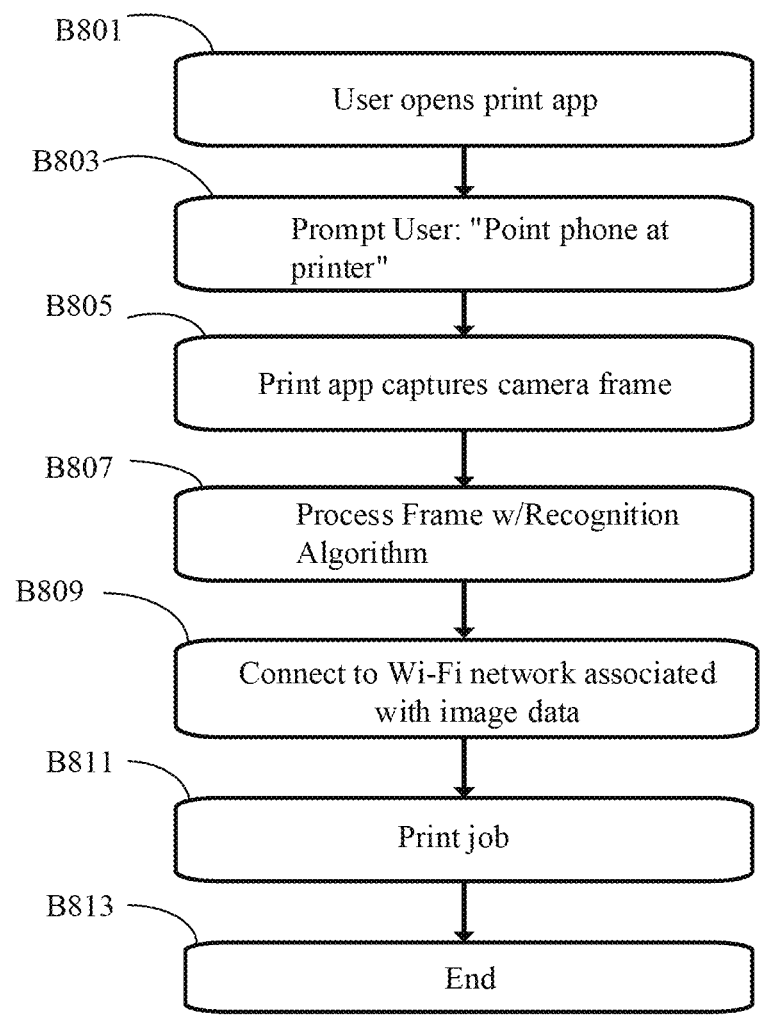
FIG. 8 illustrates an exemplary embodiment of a method of determining configuration information using a print application.

FIG. 8 illustrates an example embodiment of a method of determining configuration information using a print application. Although this operational process is presented in a certain order, some embodiments may perform at least some of the operations in different orders than the presented order. Examples of different orders include concurrent, parallel, overlapping, reordered, simultaneous, incremental, and interleaved orders. Thus, other embodiments of the operational process may omit blocks, add blocks, change the order of the blocks, combine blocks, or divide blocks into more blocks.

The operational process in FIG. 8 begins with block B801, where a user activates the print application by selecting an image element representing the print application icon shown on the display screen of the user's mobile device. The print application thereafter dynamically activates the camera of the mobile device and starts providing the operational instructions as one or more text, or image elements on the display screen of the mobile device. In block B803 the print application provides instructions to the user by overlaying the text or image on the display screen of the mobile device to point the camera of the mobile device towards the various print devices available within the user's environment. It is to be noted that in case the user wants to select any particular print device present within an environment, the user may accordingly focus the camera of the mobile device towards a specific print device and the print application accordingly initiates the connection requests as per the exemplary embodiment stated in FIG. 3A-3D.

Next, in block B805, the print application causes the camera to capture one or more images or a series of images as a video stream of any print devices present within a field of view of the camera. In one embodiment, the print application causes a single image to be captured and further processing as described below if performed on using the single captured image. In some embodiments, the print application causes a plurality of image frames to be captured in sequence as a video data stream and the processing described below is performed on one or more of the individual image frames that comprise the video data stream.

In block B807, the print application continuously processes each image frame using an image recognition process to determine whether the image information, configuration information associated with the print device captured in the image frame of the mobile device is available at the network, cloud storage or at the server. The image recognition application may use one or more image recognition algorithms which may reside within the storage system of the mobile device or at the remote server. Further, the image recognition process may also use other well-known machine learning algorithms, follow a process of training the recognized images, or may use other image feature matching algorithms. The training of the recognized images may include but is not limited to image template matching or using 3-dimensional object scanning algorithms to detect various features on the captured images for example, shape, color, corner points, various other characteristics of the captured image, feature matching algorithm, similar object detection methods or any other well-known computer vision algorithms.

Therefore, once the image recognition application recognizes at least one object within the captured image frame as a print device, the print application determines the associated device ID such as model number, and recognizes the configuration information associated with print device in the image frame captured. Once the print application determines the configuration information associated with the print device captured in the image frame of the mobile device. The print application in block B809 performs the configuration information of the print device to the mobile device and initiates the communication connection between the print device and the mobile device. The print application next sends the print job stored at the memory storage of the mobile device to the print device in block B811 and the operational process ends at B813. The various modifications of initiating the communication process between the mobile device and the print device is further explained below.

Figure 9:
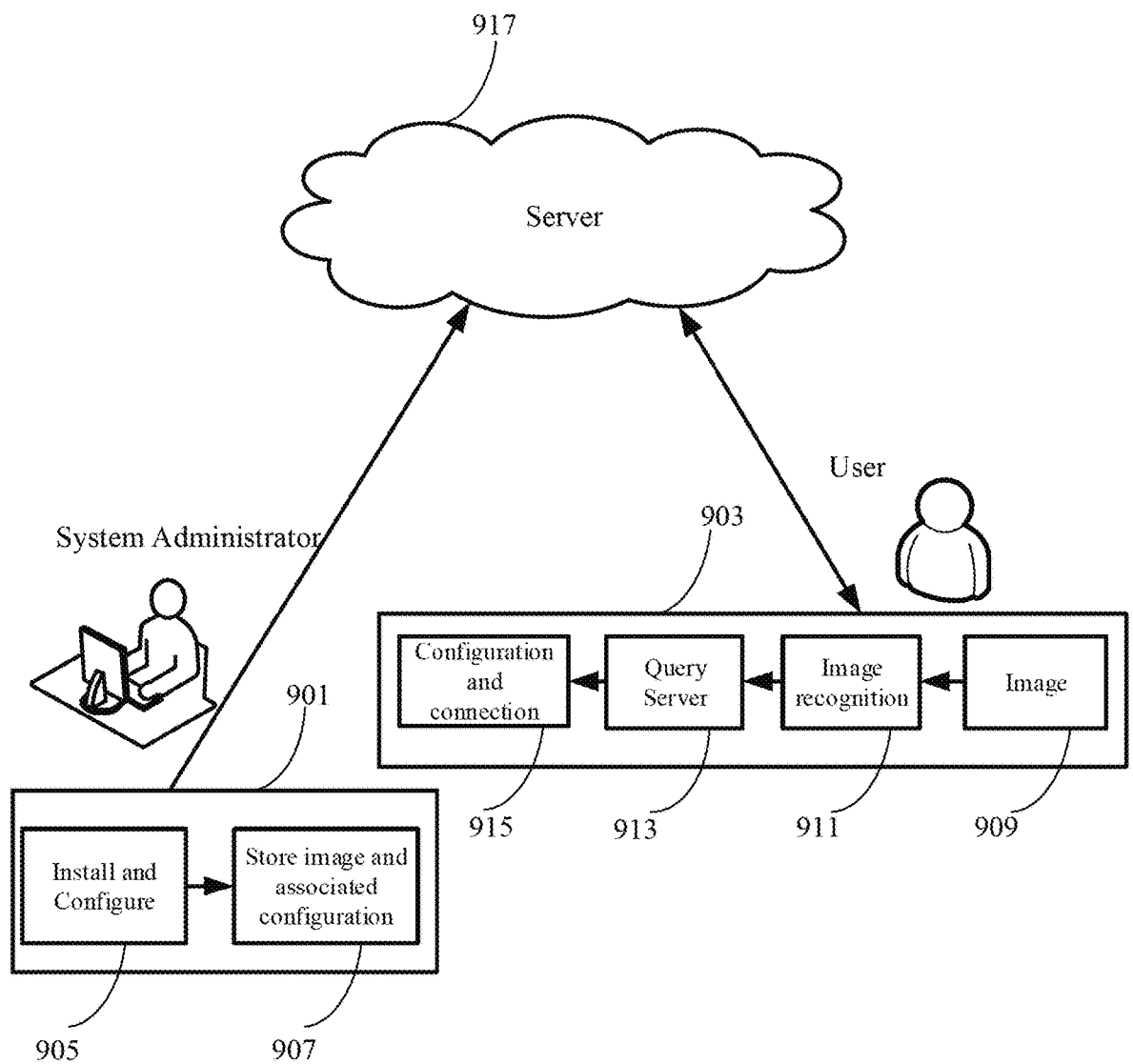
FIG. 9 illustrates an exemplary embodiment of a method of determining configuration information using a print application.

FIG. 9 illustrates an example embodiment of an operational process using print application. In particular, FIG. 9 illustrates an exemplary embodiment of storing and accessing the print device information using the print application.

FIG. 9 shows a block 901 which illustrates the operational processes performed by a system administrator, a server 917 and a block 903 illustrating the operational processes performed by the user. The server 917 also configured to function as control server (104, FIG. 1) and/or database repository (105, FIG. 1) and is accessed by the system administrator and user over the network 103 (FIG. 1). The system administrator in block 901 manually performs the installation and configuration (905) setup of the print device at the wired or wireless network. The installation and configuration of the print device may include but is not limited to, manually identifying the print device name, device ID, access level, SSID, IP address, print device environment (e.g., location), domain name, password, print setting, print policy etc. and manually configuring the print device to initiate the communication connection at the network. The process of manually installing and configuring the print device is performed for each print device available over the fleet under the block 905. After performing the manual installation and configuration (905) of the print devices at the network, the system administrator captures images, using a camera device or using the camera of a mobile device, of each print device configured at the network. The system administrator stores these images of each print device available at the fleet with the respective configuration information as shown in block 907. Once the configuration information is associated with the image of each print device available at the fleet, this information is thereafter stored at the server 417 or at the cloud storage, and accordingly automatically accessed by using print application. In some embodiments, the system administrator stores the configuration information associated with the image of the print device in the memory storage of the computing device (e.g., computer, mobile device, laptop) and may distribute the configuration information based on the individual need of the user by sharing such information over URL. In some embodiments, the system administrator may store the configuration information associated with image of the print device by storing in one or more database and making it available at the internal (e.g., corporate network) intranet or by sending information over URL to the user's mobile device.

The sever 917 can be configured to function as one or more control servers (104, FIG. 1) or database repository (105, FIG. 1) and the information of the image of the print device and the configuration information associated with the image of the print device, can accordingly be accessed over the server 917 via wired or wireless network by the print application. The association of the image of print device with the configuration data may be performed using image metadata. For example, association of the image of the print device with the configuration information may include identification of image of print device with the print device name (e.g., ABC 4561), device ID (e.g., Accounting department), environment information (e.g., Room 123, building A), and associating one or more configuration information, such as the Wi-Fi ID (e.g., AB238), a Password, permission (user authorization), the IP address, the domain name, print policy (e.g., user access level, permission to access scan), print device setting (e.g., duplex, B&W, paper size). As such, one or more pieces of configuration information of each print device is associated with the image of print device and is stored at the server 917 (e.g., in one or more database repository 105 (FIG. 1), control server 104 (FIG. 1)). The system administrator performs the similar process of storing the image of the print device and the configuration information associated with print device image, when any new print device is introduced in an environment or at the fleet. Therefore, the information at the server 917 stays updated whenever a new print device is introduced at the network, and the user can accordingly access without any hassle.

Once the administrator stored all the images of the print devices and the respective configuration information associated with the image of each print device at the server 917. The user in block 903, operates the mobile device and activates the print application by selecting the image element representing the print application icon (not shown) on the display screen. The print application dynamically activates the camera of the mobile device. The user points the camera of the mobile device to capture the image or stream video of the device available within an environment or within the field of view of the mobile device's camera in block 909. As user points the camera of the mobile device to the available device, the display screen of the mobile device starts displaying the image of device, the image detection and image recognition process of print application starts extracting the features of device captured in the image in block 911. The print application performs the image detection and recognition in block 911 using one or more image matching algorithms or machine learning algorithms. The print application then determines that the device captured within the image frame is a print device and the captured device in the image frame belongs to print device name, such as "ABC". The image recognition in block 911 may also use one or more image recognition algorithms which may reside within the storage system of the mobile device or at the remote server 917. Upon detecting and recognizing the device as a "print device" and the print device name as "ABC" in the image frame, the print application dynamically sends information as an inquiry to the server in block 913 using REST/Socket protocol. Upon sending the inquiry request to the server 913, the server 913 sends a request to the server 917. The print application using one or more image feature matching algorithm or machine learning algorithm matches the image data of the captured print device with the pre-stored print device image data and the associated configuration information of the print device data at the server 917 by the system administrator. Once the print application determines the pre-stored print device image data associated with the configuration information, matches the print device in the image as captured by the mobile device, the print application automatically starts configuring the communication connection request 915 of mobile device to the print device. In some embodiments, the print application automatically recognizes the configuration information associated with the image of the print device captured by the mobile device and initiates the connection request with the print device to establish the network communication connection. For example, once the print application recognizes in block 911 the image frame as a "print device" and print device name as "ABC", the print application sends this information as a request to query server in block 913 in order to search the associated configuration information of the "print device named ABC". As such, print application using one or more image matching algorithm matches the information of "print device named ABC" with the pre-stored "print device" image data stored by the system administrator at the server 917. The print application automatically searches the "print device named ABC", and searches the associated configuration data of the image of "print device ABC". The associated configuration information of the image of print device may include and is not limited to Wi-Fi name, password, department ID, print policy and print setting etc. Accordingly, the print application automatically performs the configuration settings required to initiates the communication connection between the mobile device and the "print device ABC" in B915. The different variations of connecting the mobile device and print device is further explained below.

Figure 10:
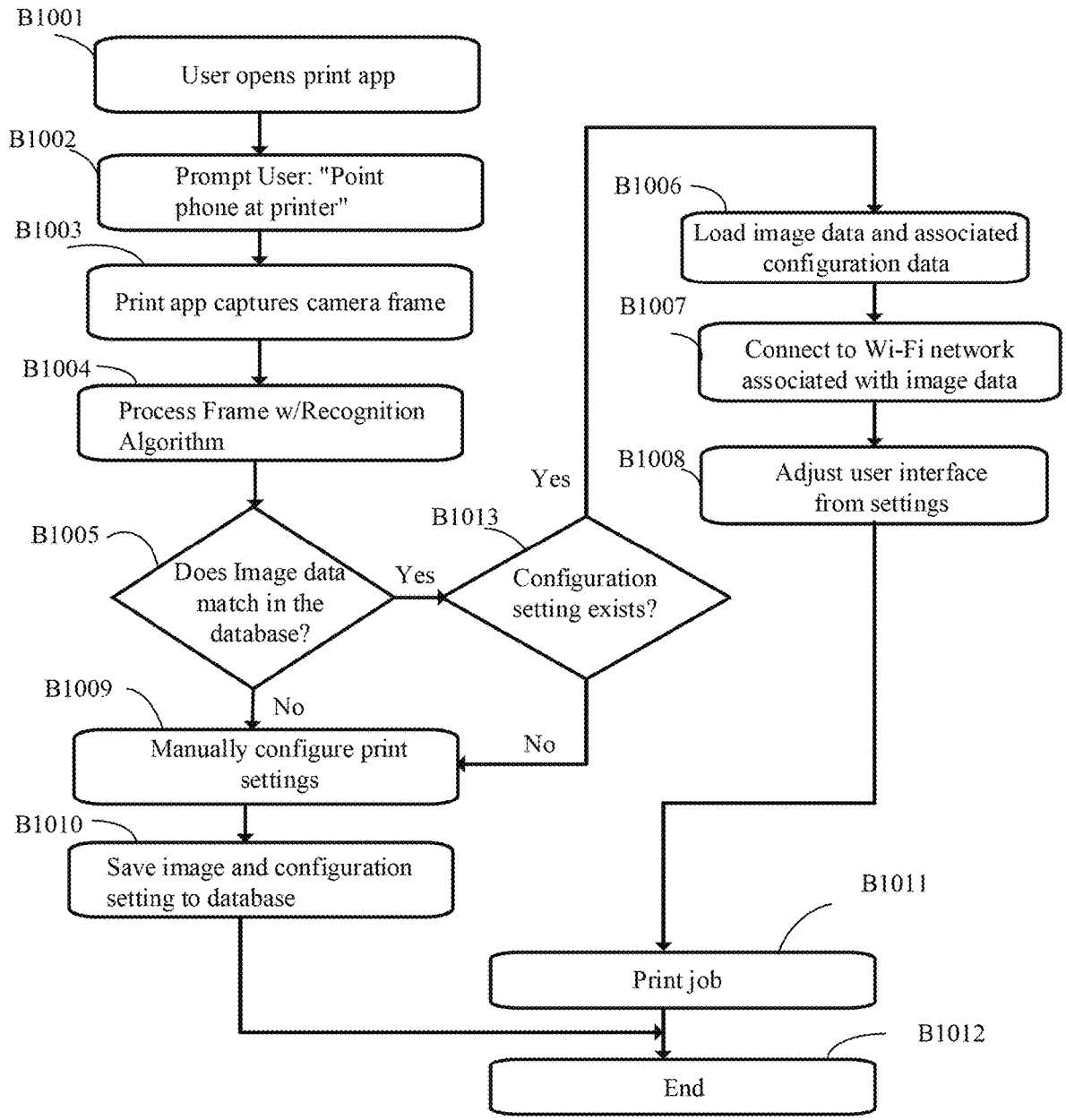
FIG. 10 illustrates an exemplary embodiment of a method of determining configuration information using a print application.

FIG. 10 illustrates an exemplary embodiment of an operational flow for using a print application. In particular, operational flow in FIG. 10 illustrates an example embodiment of setting a communication connection between a mobile device and a print device, which may be performed by a user on a daily basis using a print application.

The operational flow in FIG. 10 starts with block B1001, where user activates the print application. The flow proceeds to block B1002, where the print application dynamically activates the surface camera of the mobile device and starts providing the operational instructions as one or more text or image on the display screen of the mobile device. In block B1002, the print application provides instructions to the user by overlaying the text or image on the display screen of the mobile device to point the camera of the mobile device towards the various print devices available within the user's environment.

In case there are multiple print devices available within the user's environment and the user is not sure which print device is available with the configuration information for user's mobile device, the below-mentioned operational process is accordingly followed to determine which print device is ready to connect among multiple print devices at the network using user's mobile device.

In block B1003, print application causes the camera to capture one or more images or a series of images as a video stream of any print devices within a field of view of the camera. In one embodiment, the print application causes a single image to be captured and further processing as described below if performed on using the single captured image. In some embodiments, the print application causes a plurality of image frames to be captured in sequence as a video data stream and the processing described below is performed on one or more of the individual image frames that comprise the video data stream.

In block B1004, the print application continuously processes each image frame using an image recognition application to determine that the captured image include one or more print devices. Once at least one print device in image frame is recognized, the device ID, device make and device model, information is determined. The image recognition application may use one or more image feature matching algorithms or one or more machine learning algorithm which may reside within the storage system of the mobile device or at the remote server.

Once the image recognition application recognizes at least one object within the captured image frame as a "print device", the print application determines the associated print device ID or device name in B1004. The details of how an image recognition process is performed on an image frame once an image or video stream is captured, and how the image data and attribute information of the print device, such as device ID or model number, is evaluated to the recognized print device in the image frame is already explained above. The image recognition process in the captured image frame is further processed to determine the environment (e.g., location of the print device as Room 123, Building A) of the print device. The determination of the print device environment may be performed by the print application using one or more image feature recognition algorithm or using machine learning algorithm It should be noted, the one or more information related to image recognition using image feature match and/or machine learning algorithm is pre-stored in one or more database repository 105 (FIG. 1) or control server 104 (FIG. 1) and can be accessed by print application using one or more programs. Once the print application determines using one or more image matching algorithms the print device and the environment (Yes, B1005), the print application follows the process in B1013. In B1013, the print application determines whether the configuration information of the print device present at the environment (e.g., location, Room 123, Building A) as detected in image frame matches with the configuration information pre-stored at the server 917 (FIG. 9). The print application determines whether the information related to print device and its environment (e.g., location) associated with the image frame matches with the pre-stored information of the print device with the pre-stored print device environment (e.g., location) information at the server (Yes, B1013). The print application thereafter follows the process step in B1006. However, in a case where print application determines that the information related to a print device and the respective environment (location) of the print device, associated with the image frame as captured by the mobile device does not match with the pre-stored information of the print device and the environment (e.g., location) information of the print device at the server (No, B1013), The print application follows the process step in B1009.

Further to following the process in B1013 (Yes, B1013), the print application automatically determines the configuration information associated with the print device and the environment (e.g., location) of the print device, as identified in the image frame. The determination of the configuration information may perform the process of information matching, for example, using the information of the print device and the environment information of the print device from the image frame, and matching this information with the pre-stored information at the server 917 (FIG. 9). Upon determining the configuration information associated with the print device (e.g., "print device ABC123"), and the environment information (e.g., "Room 123, Building A)", the print application automatically loads the configuration data of "print device ABC123" and presents at environment (e.g., location) "Room 123, Building A" to the mobile device. For example, the print application automatically retrieves the configuration data associated with the "print device ABC 123", located at "Room 123, Building A"; the configuration data may include the following: Wi-Fi network ID, Wi-Fi network password, print setting information (duplex, color etc.), print device access (e.g., authorization), print device policy (e.g., permission to access scan) in B1006. In some embodiments the print application automatically loads the configuration information to the user's mobile device by automatically switching to the correct Wi-Fi network/setting (e.g., active directory/department ID) required to initiate the communication connection of the mobile device with the print device. In some embodiments, the print application can automatically grant access to the print device based upon the pre-stored user access information and can automatically configure the print setting (e.g., B&W print) based upon pre-stored user requirement.

Once the print application determines the configuration information associated with the image of the print device in B1006, the print application follows the process in block B1007. In B1007, the print application automatically initiates the communication connection with the print device over wireless network. The user interface settings of the print device are automatically adjusted to match the print device policy and print device settings in block B1008 based upon the configuration setting required for the mobile device. The user processes the print job in block B1011 and the process ends in B1012.

However, in case, in block B1005 the print application determines that the information of image data of the print device as captured by the mobile device in the image frame does not match with the pre-stored information of image data of the print device at the server 917 (FIG. 9) or at the cloud (not shown). The print application displays such information by overlaying a text message or an image on the display screen of the mobile device for displaying an error, for example, the configuration information associated with the information of image data captured by the mobile device is not stored at the network. The print application additionally provides an option to the user in block B1009 to manually enter the configuration information of the print device as recognized in the image frame. In block B1010 a user can manually enter the configuration information of the print device by entering the Wi-Fi network name, Wi-Fi network Password, desired print settings, location of the print device, and any other ID information. Such configuration information is then accordingly saved by the user manually at the server 917 (FIG. 9) or at the cloud storage. Once user saves the configuration information associated with the print device captured in the image frame of the mobile device, the print application automatically associates the print device recognized in the image frame of the mobile device using print application with the configuration information manually stored by the user at the server 917 (FIG. 9). The print application accordingly initiates the communication connection based on the manually stored configuration information by the user and processes the communication connection between the print device and the mobile device using print application. The user in block B1011 sends the print job to the print device and the process ends in block B1012.

The similar processes as mentioned in B1009-B1012 is followed in a case where print application determines negative response in B1013 (No), i.e., the image data of the print device as captured in the image frame does not match with the related information of the environment information of the print device. For example, print device name "ABC123" recognized in the image frame of the mobile device may available at two different locations "Lobby, building A" and "Room 123, Building A". The configuration information of print device "ABC 123" located at the location "Room 123, Building A" may be pre-stored at the server and accordingly accessed by the print application. There may be a scenario where the print application recognizes that the some of the image information of the print device (e.g., print device named "ABC 123") matches with some of the image information of print device name/ID pre-stored at the server, however the environment information of print device (e.g., ABC 123) does not match with the environment information (e.g., location "Lobby, Building A") as pre-stored at the server. This could be a situation where print devices with similar device names/ID's exists, but are at present at different locations within an area. The configuration information in such case for one of the similar print device based on its environment location information may not be available or pre-stored at the server 917 (FIG. 9). The print application in such a scenario will receive a response as "No" from B1013, and follows the process from B1009-B1012 by manually entering the configuration information associated the print device captured in the image frame of the mobile device and accordingly store the respective information at the server 917 (FIG. 9) in a manner similar to as recited above.

FIG. 11 through FIG. 17 illustrates the process of image recognition to determine the print device ID and/or the attribute information of a print device captured by the mobile device using print application and automatically searching the communication network associated with the image of the recognized print device ID and/or attribute information. The print application automatically initiates the communication connection of the mobile device and print device upon finding the network connection matching the print device attribute information. The recognition of the attribute information and searching for the communication network associated with the print device as captured by the mobile device using print application is already explained above in part and can be reference herein accordingly.

Figure 11:
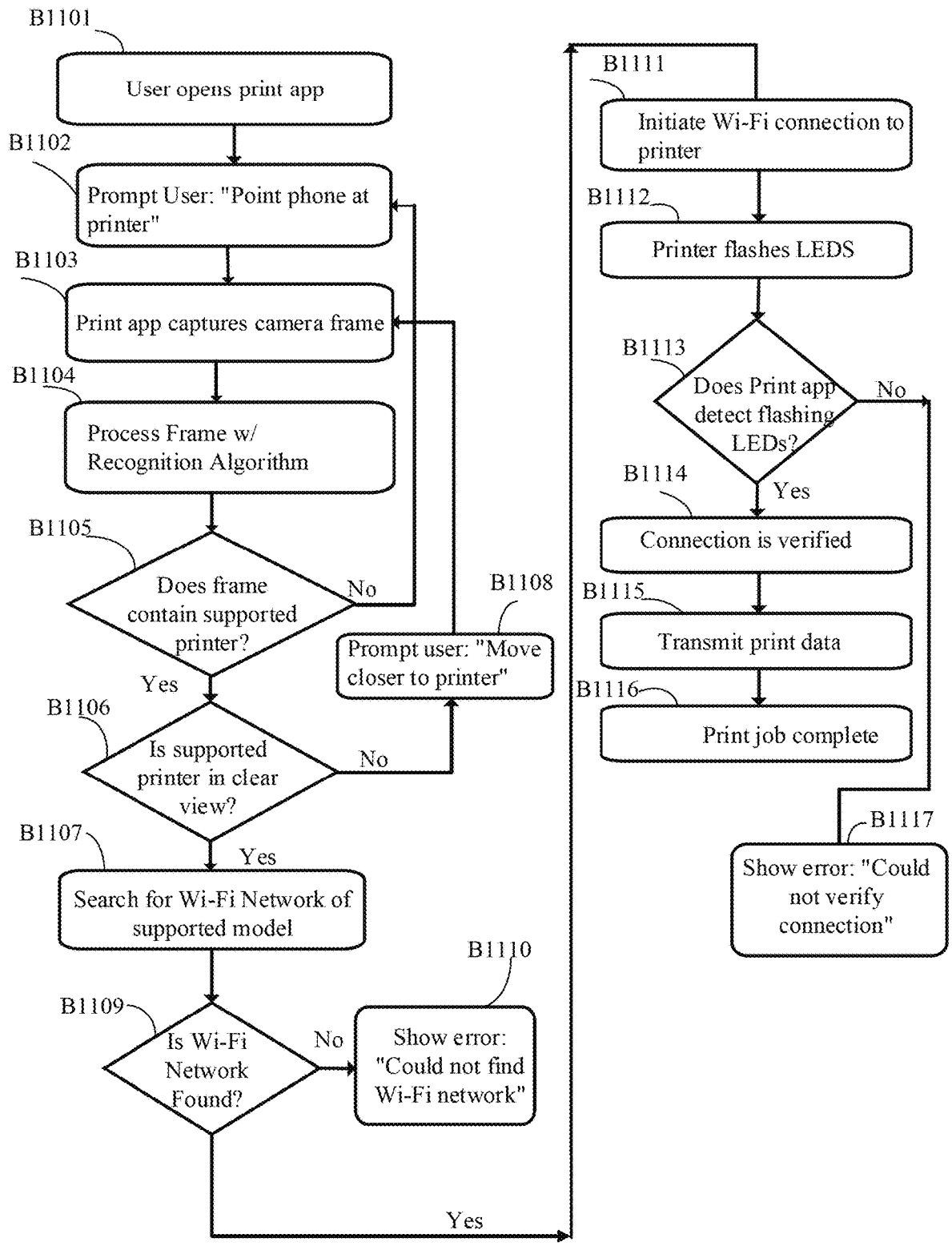
FIG. 11 illustrates an exemplary embodiment of a method of using a print application.

In particular, FIG. 11 illustrates an exemplary embodiment of an operational process for using the print application.

The operational process in FIG. 11 starts with block B1101, where user activates the print application by selecting an image element representing the print application icon shown on the display screen of the user's mobile device or in tablet. The process then proceeds to block B1102, where the print application dynamically activates the mobile device camera and starts providing the operational instructions as one or more text or image on the display screen of the mobile device. In block B1102, the print application provides instructions to the user by overlaying the text or image on the display screen of the mobile device to point the camera of the mobile device towards the various print devices available within the user's environment. It is to be noted that in case user wants to select any particular print device, the user may accordingly focus the camera of the mobile device towards the selected print device, and the print application accordingly initiates the connection requests as per the exemplary embodiment stated in FIG. 4A-4D.

However, in case there are multiple print devices available within user's environment and user is not sure which print device is able to communicate and connect at the network using user's mobile device, the operational process as stated in the above-described embodiments is accordingly followed.

Next, in block B1103, print application causes the camera to capture one or more images or a series of images as a video stream of any print devices within a field of view of the camera. In one embodiment, the print application causes a single image to be captured and further processed as described below if performed on using the single captured image. In some embodiments, the print application causes a plurality of image frames to be captured in sequence as a video data stream and the processing described below is performed on one or more of the individual image frames that comprise the video data stream.

In block B1104, the print application continuously processes each image frame using an image recognition application to determine that the captured image include one or more print devices. Once at least one print device in image frame is recognized, the device ID, make, model, serial number, SSID information, or MAC address information of the print device is accordingly determined. The image recognition application may use one or more image recognition algorithms which may reside within the storage system of the mobile device or at the remote server. Further, the image recognition application may also implement other well-known machine learning models or follow a process of training the recognized images. The training of the recognized images may include but is not limited to the image template matching, 3-dimensional object scanning algorithms to detect various features on the captured images (e.g., shape, color, corner points or various other characteristics of the captured image), feature matching algorithm, similar object detection methods, or any applicable computer vision algorithms.

As such, once the image recognition application recognizes at least one object within the captured image frame as a print device, the print application further determines the associated device ID, such as model number, SSID, MAC address information of serial number etc., in B1104. The details of how an image recognition process is performed on an image frame once an image or video stream is captured, and how the attribute information of the print device such as device ID, model number, SSID, MAC address information of serial number etc. related to the recognized print device in the image frame is determined is already explained above.

The print application then follows the process in block B1105, and determines whether the recognized image of the print device and the associated print device model number is supported by the user's print application. It is to be noted that, the print application has the ability to detect and recognize various print devices within an image frame and their device ID's. However, it may be possible that the recognized print device within the image frame may not be supported and/or compatible with the print application to perform the end job. Therefore, in B1105 if the response is "No", the print application determines that the captured print device in the image frame is not supported by print application to perform the print job and the print application follows the process steps from B1102-B1105, until the print application determines the supported print device (i.e., B1105, "Yes") within an image frame. In case the print application determines that none of captured image frame of the print devices supports the print application, the user of the mobile device is notified with an error message via a text or an image display on the display screen of the mobile and the print application ends the process.

Next, in a case where the print application determines that the image frame of the print device is a supported print device with the print application (B1105, "Yes"), the print application then determines whether the print device as seen in the image frame meets the expected image quality. This process step helps the print application to assure and verify that the print device as captured in B1103 and recognized in B1104 meets the certain image quality standards before print application starts searching for Wi-Fi connection information matching the attribute information of the print device. To determine the image quality standards, a confidence score is implemented to decide whether the captured image frame of the print device as seen on the display screen of the mobile device is in clear view or not. The process of finding whether the print device as captured in the image frame is in clear view may be performed by one or more programs by comparing, matching the pixel values and image resolution of the print device, as captured in the image frame with the pre-stored image frames of the similar print device in the database repositories. The comparison score is thereafter compared against the preset threshold values. Only an image frame with the final score above or equal to the acceptable match with the threshold value can proceed to the next step in the operation process.

Based on the acceptable match score value of the image frame, the print application may determine whether the print device is in the expected clear view to perform the next operation or not. For example, if print application determines that the captured image frame of the print device and the image of the print device as stored in the storage repository generates a comparison score equal or above a certain threshold (e.g., above 50 percent), the print application determines that the print device as supported by the print application is in the clear view to proceed to the next operation shown in block B1107. In the event that the comparison score is below 50 percent threshold value, the print application determines that the image view of the print device is not in a clear view (i.e., B1106 "NO"). In such a case, the print application follows the operational process of block B1108. In block B1108, the print application provides an instruction to the user as a text or image displayed on the display screen of the mobile device, to reposition the camera module, for example, get closer to the print device so that the captured image frame of the desired print device may meet the required image quality. Accordingly, the print application starts following the process from B1103-B1106 until a clear view of the supported print device is determined in B1106.

Next, the print application follows the step in block B1107 one the print application receive a response from B1106 as "Yes". In B1107, the print application automatically starts scanning (or searching) the available networks for network identifiers that corresponds to the characteristic information of the print device ID. For example, if print application detects a print device with model number "PIXMA 2481" within an image frame in B1104, the print application automatically searches for an ad-hoc Wi-Fi network connection comprising network identifier name as, "PIXMA 2481". In some embodiments, in a case where the print application determines one or more characteristic information of the print device such as serial number of print device or MAC address of print device, as a print device information, the print application may scan (or search) for Wi-Fi network including devices with the determined characteristic information to initiate the connection request.

However, as stated above the print application may not be limited to initiating the communication connection between the mobile device and the print device based the ad-hoc Wi-Fi connection and may include initiating one or more other communication connections as well. For example, the print application may use determined print device characteristic information, such as MAC address information or serial number information of the print device, and search the infrastructure Wi-Fi network connection using Bonjour or a similar zero connection configuration protocol. The print application may monitor network packets broadcasted by the print device and may associate the print device identifier information with the one or more broadcasted packet information and accordingly search for the infrastructure Wi-Fi network connection protocols associated with the characteristic information of the print device, and initiate the communication connection request in the infrastructure Wi-Fi connection.

In some embodiments, a user may change the SSID or the associated network name of the print device. In such a scenario, the print application may determine the Wi-Fi network which is broadcasted by the MAC address or the IP address of the print device, this may include the device ID/model number as well. This ensures that the print application maintains the connection between the print device and the mobile device with the right network without any inconvenience and ensures that the user is connected with the right print device that the user wishes to use.

Moving to block B1109, the print application determines whether the ad-hoc wireless connection associated with the detected print device ID or the characteristic information of the print device is present. In case, the wireless connection specific to the print device model number is detected by print application (B1109 "Yes"), the print application initiates the Wi-Fi wireless connection request with the print device B1111. Whereas, in case B1109 provides a response as "No", i.e., the Wi-Fi connection for the print device is not found, the user is provided with an error message in the form of text or image on the display screen of the mobile device as shown in Block B1110. The additional details for the alternative steps required in a case where a Wi-Fi network associated to the print device as detected in the image frame is not found is explained in FIG. 14.

Further, upon initiating the connection request over Wi-Fi wireless connection (B1111), the print application follows the next step of block B1112, where the print device provides one or more indicator pattern such as flashing lights displayed on the front interface panel of the print device by means of LED indicator. In some embodiments the indicator pattern may be generated by at least a portion of a display screen on the print device whereby the print device causes a set of pixels of the display screen to be illuminated in a particular pattern and/or with a particular color pattern. The indicator pattern may include audio or visual indicator pattern. The audio or visual indicator pattern are briefly explained above and can be referenced here. Additionally, further details on how print application detects these indicator patterns (in particular LED flashing pattern) and the information that can be decoded from these indicator patterns is explained herein below.

The process whereby the print device causes indicator patterns to be output, such as visual indicator patterns, audible indicator patterns synchronized as a visual indicator patterns, and audible indicator patterns, is useful in a scenario where there are multiple print devices with similar device ID's are available within an environment. In such a scenario, even though the print application is able to connect the user's mobile device with the available print devices but the print application may or may not be sure which print device the user should expect to output the print job. Additionally, the output of indicator patterns is useful to determine whether the print device which is right in front of user is the one correctly connected to the mobile device over the Wi-Fi network. Therefore, to avoid this confusion, the print device provides and indicator pattern (also mentioned as signal patterns) information which may include and not limited to visual or audio indicator pattern information. This signal pattern information is captured by the print application in one or more frames of the video data stream.

As noted above the indicator pattern may include a visual or audio indicator pattern. The visual indicator pattern information may include indicator pattern (e.g., flashing LED light) displayed on the display screen of the print device and the audio indicator pattern information may include audible sound (e.g., a ring sound or a beep) provided by an internal speaker of the print device or externally attached to print device. The indicator pattern information provides another level of confirmation that the print device with which user is trying to connect is indeed the one user is correctly connected at the network and can expect the end job from.

In order to detect the audio signal indicator pattern, the print application may dynamically activate an audio component from the display screen of the mobile device, such as, an input/output audio component of the mobile device (e.g., a microphone) to capture the audio indicator signal pattern. The print application decodes the captured audio signal pattern with information associated with the print device and provides the decoded information of the audio signal pattern as a text or as an image on the display screen of the mobile device. The decoding of the audio signal indicator pattern may be performed by a decoding algorithm stored in the memory and executed by one or more processors using one or more program. The print application may also use one or more controllers/processors to match the captured audio indicator pattern(s) data to the pre-stored audio indicator pattern(s) data of the print device with which user is trying to connect by using audio matching techniques. The audio matching techniques may include audio fingerprinting, where audio fingerprints of known objects (e.g., print devices) for each indicator pattern are pre-stored, for example, in the storage and/or database(s) described above. An audio fingerprint of the captured audio indicator pattern data may be compared to the stored audio fingerprints data to find match(es) between stored audio fingerprints of the audio indicator pattern and input audio indicator pattern. This allows one or more controllers/processors to determine the information corresponding to the audio indicator pattern and accordingly information is displayed on the display screen of the mobile device via a text or image.

The details of interpreting the meaning of any visual signal information pattern is further explained as below.

For the purpose of understanding, an example of a visual indicator signal pattern is described as an LED flash pattern as provided in B1112. However, this is merely one manner in which visual indication may be provided. In block B1113 the print application determines whether a series or pattern of flashing LED lights is detected within one or more image frames of the captured video as streamed on the display screen of the mobile device. In case the flashing LED light pattern(s) is detected by the print application, the print application accordingly follows the process of interpreting the flashing LED light pattern. It may be noted that the LED flash patterns may be a fixed LED flash pattern for example the frequency of the flashing LED light may be fixed (e.g., LED flashes "on" for 3 seconds, LED flashes "off" for 3 seconds). The print application may use machine-learning algorithm in order to interpret the meaning of LED flash pattern as displayed on display screen of the print device. The mobile device's camera captures a short video (10 seconds or less) of the flashing LED lights displayed on the display screen of the print device, and the print application analyzes each frame of the captured video file using a machine learning model to determine if the flashing LED light is ON or OFF. The machine-learning model may be trained by providing the input values derived from the Red, Blue, and Green pixel of each image frame of flashing LED light video and provides an output value/s from the machine-learning model such as whether the flashing LED light is ON or OFF. We assume that in case the output value from the machine learning model is more than the threshold value (e.g., 50 percent), the model has detected that the LED flash as ON. Therefore, for the collection of frames in the streamed video of the flashing patterns, the print application counts how many frames have the LED light flash as ON. This provides the duty cycle of the LED. The calculated duty cycle is thereafter compared to the threshold value (50% in this case) of the desired duty cycle. The connection between the mobile device and the print device is accordingly verified and the print application follows the process at block B1114, in case the threshold value is close enough.

In some embodiments, the print application may also consider different approaches in decoding the flashing LED light patterns for example, image processing algorithm to determine the LED flashing pattern. The processing steps of capturing the flashing LED light is performed in the similar manner as explained above and can be referenced here wherever applicable. The image processing algorithm differs in terms of analyzing each frame of the flash lights captured in the video file, for example print application using image processing algorithm analyzes each frame of the video file to determine if a cluster of a particular pixel value/s is found within an image frame or not. The image processing algorithm accordingly searches for the pixel values corresponding to the color of the flashing LED light (e.g., Red or Green). For the collection of frames, the print application counts how many frames have the flashing LED light as "ON". This provides a duty cycle of the flashing LED lights. This calculated duty cycle is then compared to the desired value of the duty cycle (e.g., 50 percent). If the value is close enough, to the desired fixed pattern, the connection between the mobile device and the print device is accordingly verified and the print application follows the operational process to block B1114.

The flashing pattern of the LED light indicator indicates a confirmation to the user that the identified connection by the print application for the detected print device in the image frame indeed belongs to the device, user is trying to connect and the connection is successfully formed between User's mobile device and the print device.

Once the print application analyzes the flashing LED patterns, the print application then confirms in B1114 that the Wi-Fi connection is successfully established between the mobile device and the print device. The process then follows to B1115, the print data is transmitted from the user's mobile device to the print device. In case the print application detects response as "NO" from B1113, the user is notified by an error message via a text or image display on the display screen of the mobile device in B1117.

Figure 12:
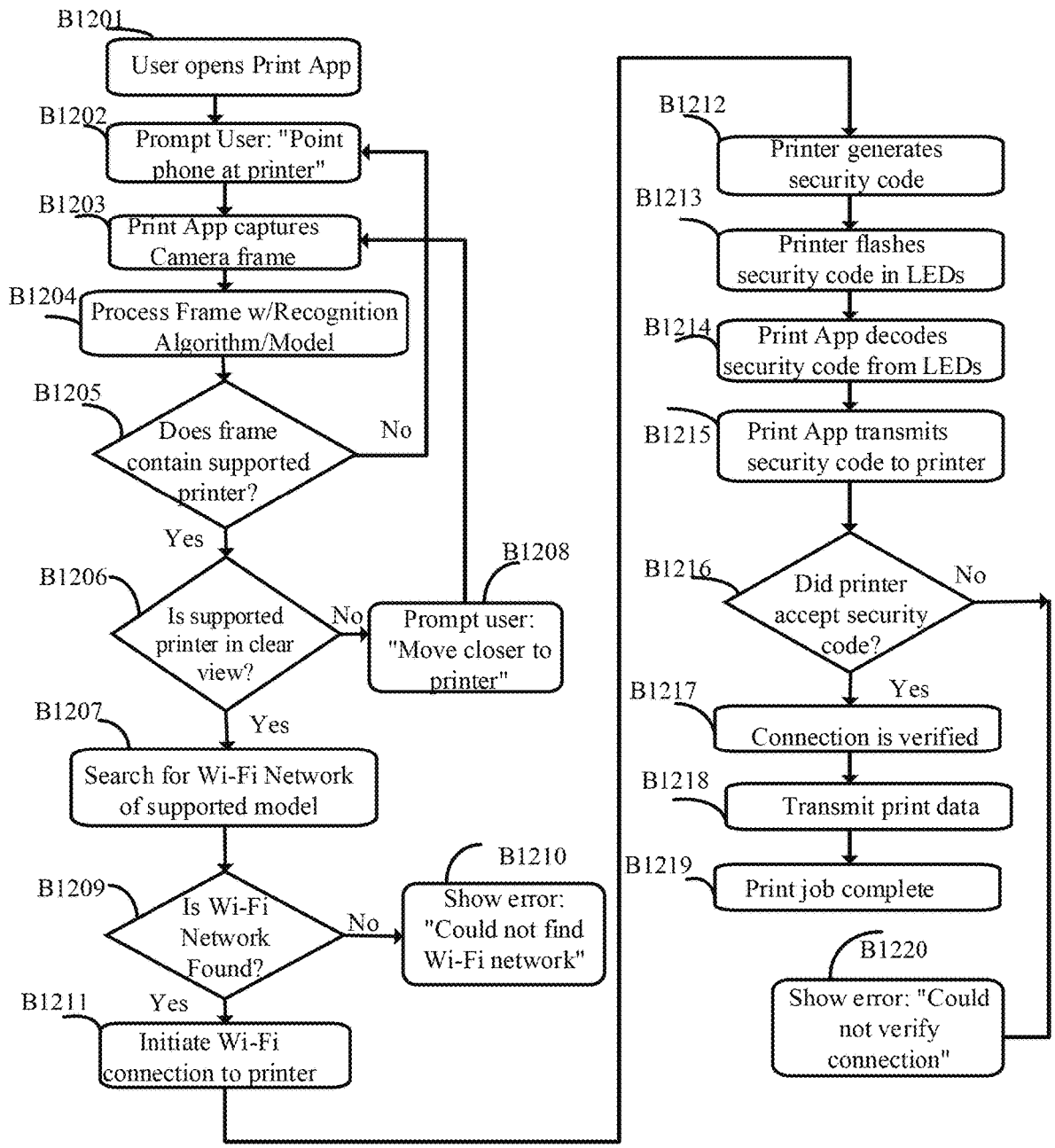
FIG. 12 illustrates an exemplary embodiment of a method of using a print application using a security code.

FIG. 12 illustrates an exemplary embodiment of an operational process for establishing connectivity between a mobile device and a print device. The operational process from block B1201-B1208 (not illustrated here) proceeds in a similar manner as described above with reference to functional block B1101-B1108 in FIG. 11 above.

Following to block B1209, the print application determines that the related Wi-Fi connection for the recognized print device within an image is found ("YES", B1209). The print application initiates the Wi-Fi connection by issuing a probe request to the print device B1211. The print device in response the request at B1211, generates a security code in block B1212 and saves this security code in the memory storage component of the print device. This security code generation can be generated randomly each time the user tries to connect with the print device using the Wi-Fi connection. This provides an additional layer of security to authorize the user and determine the physical presence of the user to use the desired print device. Once print device generates the security code in B1212, the operational process follows to block B1213, where the print device uses well known encoding algorithms to convert the generated security code into a LED flash pattern. The flash pattern causes the print device to emit the encoded LED flash pattern via dedicated indicators (e.g. LED lights) present at the print device or displayed on the display screen of the print device. In block B1214, the print application continues to analyze the image frames of the continuous video data stream as displayed on the display screen of the print device with the flashing pattern and decodes the flashing LED pattern as a security key. In one or more of the exemplary embodiments, the flashing LED light patterns may include the security code including print device's MAC address or IP address encoded in the indicator pattern, for example in the flashing LED lights. The print application may capture these flashing patterns by analyzing the image frame/s of the continuous stream of video data and thereby perform encoding or decoding of the flashing pattern to obtain information from the flashing pattern about the print device.

In some embodiments the print application may use a Morse code translator algorithm to decode the security code embedded in the flashing LED light indicator. The print application may use the Morse code algorithm to decode the individual digit/letter of the security code or any print device information (e.g., MAC address or IP address) embedded in a flashing LED light pattern. The Morse code algorithm may use the frequency of the flashing LED light/s to translate the numbers and letters of the associated security code and/or MAC address. It may be noted that encoding and decoding of security code in a flashing LED light is not at all limited to the Morse code algorithm, the print application may use any other well-known variation of methods to perform the encoding and decoding of security code embedded in a signal pattern (audio or visual).

The print application, upon decoding the flashing pattern as the security code, transmits back the decoded security code to the print device in B1215. As soon as, the print device receives this decoded security code the process follows to block B1216 to verify, whether the security code received from the mobile device matches with the pre-stored security code (as generated in block, B1212) as stored in print device's memory. In case the security code is matched with the pre-stored security code, the print application establishes the Wi-Fi communication connection between the mobile device and the print device in block B1217, and a print job is accordingly transmitted from the mobile device in B1218 to the print device using the established Wi-Fi connection.

In a case where any discrepancies found in matching the security code (B1216, NO), the print application notifies the user via a text or an image displayed on the display screen of the mobile device as a connection error as shown in block B1220 and the operational process stops.

Figure 13:
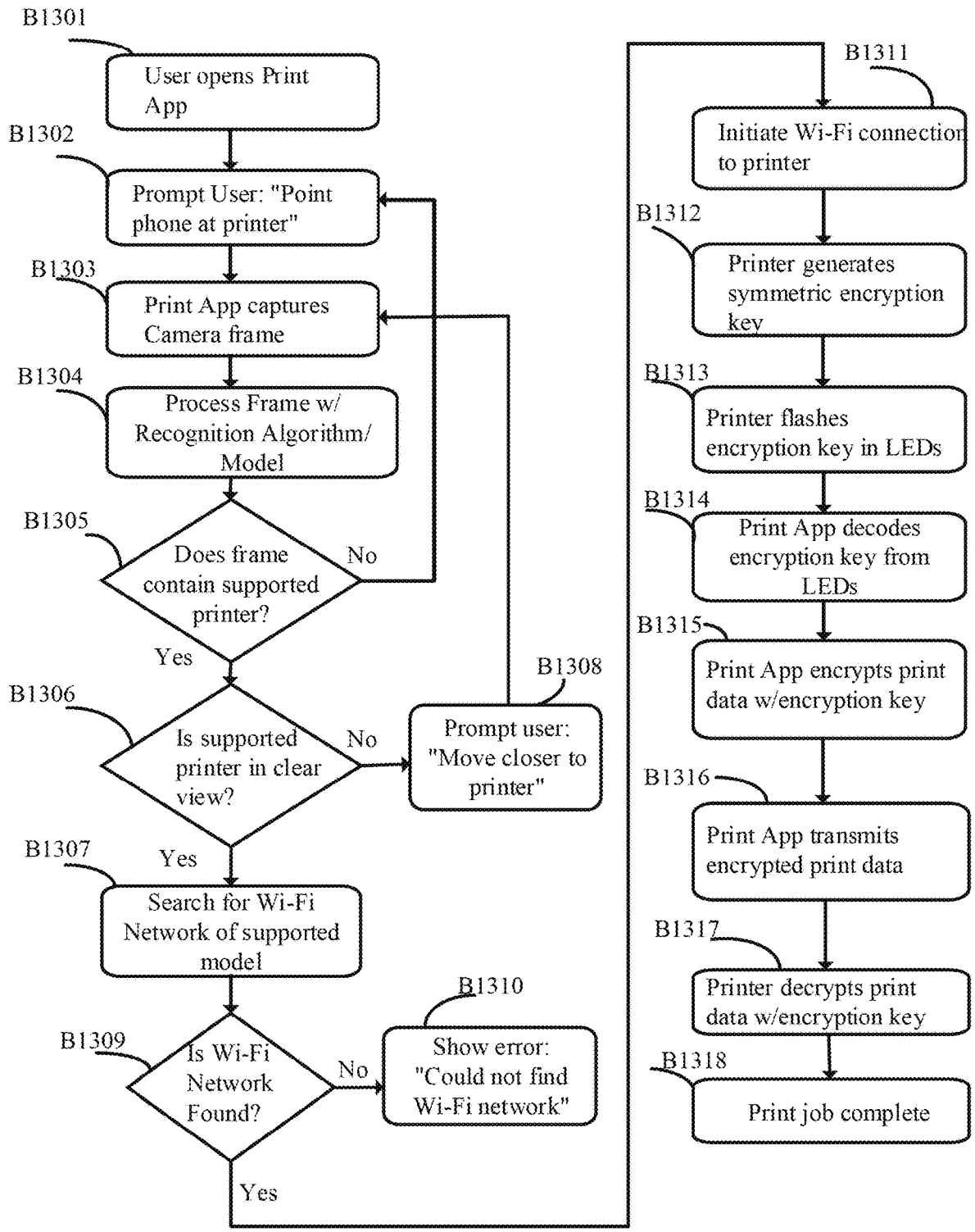
FIG. 13 illustrates an exemplary embodiment of a method of using a print application using a security code.

FIG. 13 illustrates an exemplary embodiment of connecting the mobile device and print device implementing data security.

The process begins with B1301 by opening the print application in user's mobile device and following the operational steps B1302-B1310 (not illustrated here) in a similar manner as described in block B1102-B1110 of FIG. 11 above.

In block B1311 following the response from B1309 as "Yes", i.e., the print application identifies the Wi-Fi connection matching the characteristic information of the print device in B1309. The print application therefore in B1311 sends a request to initiate the Wi-Fi connection with the print device. Upon initiating the Wi-Fi connection request with the supported print device, the print device, in response, generates a symmetric encryption key in block B1312. The symmetric encryption key may be generated by using well-known key generation algorithms or cryptography algorithms by the print device. The process of generating the symmetric encryption key may be similar to the process of generating the security code as explained in one of the embodiments above. The print device generates this encryption key dynamically whenever the print application initiates the connection request with the print device. In block B1313, the print device starts flashing the symmetric encryption key encoded in a LED flash pattern. The process and steps of encoding and decoding of the symmetric encryption key embedded within a flashing LED light may follow similar approach as explained in FIG. 12.

The print application recognizes the LED flash pattern within the captured image frame of the video stream and decodes the encryption key from the LED flash pattern in block B1314. In block B1315, the print application uses this decoded encryption key from the LED flash pattern to encrypt the print data/job stored in the mobile device's memory, providing an additional security to the print job. The operational process then follows to block B1316, where the print application transmits this encrypted print data/job to the print device to which user's mobile device is connected over communication network. Print device in block B1317 decrypts the print job with the encryption key pre-stored in the print device's memory and therefore performs the print job at B1318 accordingly.

Figure 14:
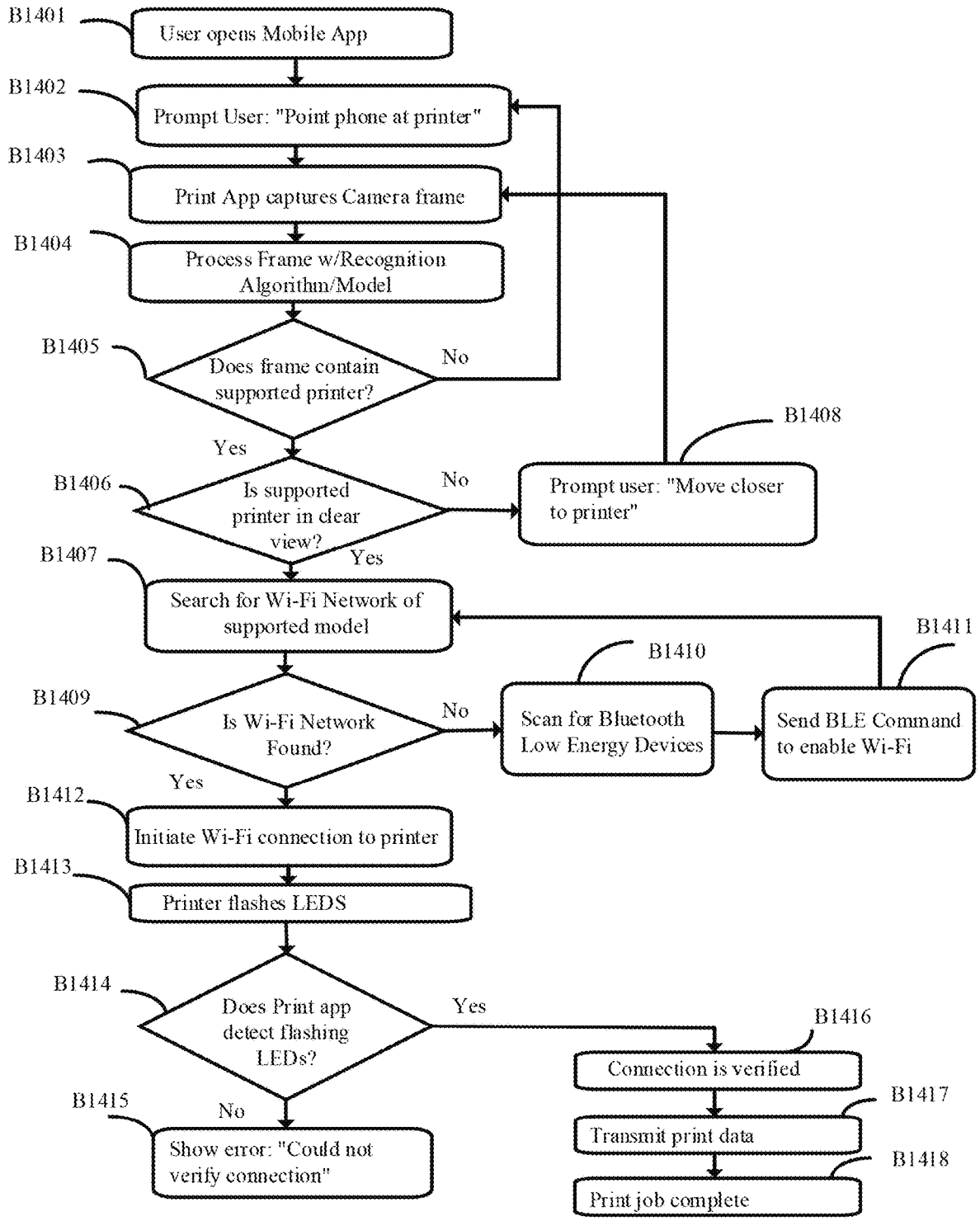
FIG. 14 illustrates an exemplary embodiment of a method of using a print application where a print device is in a power saving mode.

FIG. 14 illustrates an example embodiment where the print device is in an energy save mode. In such a case, the print application requires additional operational steps to initiate and maintain the communication connection between the mobile device and the print device.

According to some of the embodiments, as illustrated by FIGS. 2A and 2B, a mobile device and a print device supports at least one and potentially many forms of wireless or over-the-air communication network, this allows the mobile device to transmit and receive the communication with the print device. To support the wireless communication, the mobile device includes one or more communication interface components (FIG. 2A, 2B) and accordingly use any communication network, for example, NFC, Bluetooth, IR, Direct Wi-Fi, cellular, or any infrastructure network (e.g., Wi-Fi network, communication over LAN or WAN). These wireless and wired components in a communication interface provide a communication means or mechanism by which the mobile device can communicate with the print device using any network.

The following embodiment explains a scenario where the print device to which user wants to connect is in a standby power state. It is well known that the power management component of the print device maintains the power state of a print device and accordingly keeps the print device in sleep state or awake state depending upon the usage of the print device.

Referring to FIG. 14, the operational process begins with activating the print application (B1401) in user's mobile device, pointing the mobile device (B1402) to capture an image or video stream of the print device (B1403) to which the user wants to connect, processing the image frame (B1404), analyzing if the image frame contains supported image of print device to which connection is required (B1405). In case, the image frame contains supported print device as "yes", process follows to B1406, where the analysis of print device view area is performed. In case the image preview in B1406 is not clear the user is advised to follow the process B1403-B1406 until a supported print device view is cleared. All these operational processes from B1401-B1406 are performed in a similar manner as performed in block B1101-B1106 in FIG. 11 and is therefore avoided to be mentioned in much details here.

Following to the operational process in block B1407, the print application searches for the Wi-Fi communication information for the print device as identified in B1401-B1406. In block B1409, the print application determines whether the ad-hoc Wi-Fi network identifier for the print device to which user wants to connect is found. If the response in block B1409 is found positive, i.e., Wi-Fi connection identifier related to the characteristic information of the print device as recognized in the image frame is found (Yes, B1409), the print application initiates the Wi-Fi connection request in B1412. To this connection request, the print device starts flashing the LED flash indicator pattern in B1413. This LED flash indicator pattern is recognized by the print application in a similar manner as already explained above. The operational process in B1416 is accordingly followed once the indicator pattern is recognized. The connection is verified between the mobile device and the print device in B1416, and the print job is accordingly transmitted in B1417 over the Wi-Fi communication connection and the operational process for the print job is completed at B1418. However, in the event the response in block B1414 is negative i.e., print application is not able to detect the LED flash indicator pattern (B1414, "No"), in such case, block B1415 notifies the user that the connection between mobile device and the print device has an error and the operational process therefore ends.

As noted above, the print application in some embodiments may not be able to determine the ad-hoc Wi-Fi communication protocol of the print device in the image frame. One of the reasons for not able to find the Wi-Fi communication protocol for the print device may be that the print device detected by the print application is in a power saving mode. In other words, the print device may be in a sleep mode and accordingly the Wi-Fi Direct protocol of the print device may also be in a power saving mode. For this reason, the print device as detected by the print application in the image frame is in power saving mode or sleep mode, the print application as a result may not be able to detect the presence of the print device in a Wi-Fi network. As such, the present exemplary embodiment explains the operational process when the print application in block B1409 provides a response as, "No". The print application then follows the operational step of block B1410. However, it is understood that in the event if the print device is in a power saving mode the access point of the print device may stay active in low power state. Therefore, referring to response "NO" for B1409 where print application is not able to find the Wi-Fi network identifier associated with the print device as determined in B1401-B1406. The print application in this scenario performs the operational step B1410, i.e., print application scans whether the print device is available or providing any BLE signals.

In B1410 once the print application scans the presence of the print device using BLE signals, the print application then sends the probe request via BLE command to enable the Wi-Fi hardware or Wi-Fi radio of the print device in block B1411 to which user wants to connect. In some embodiments, the print application may identify the print device hardware address or manufacturer information of the print device, using one or more image recognition algorithm. The print application may use identified hardware address or manufacturer information of the print device, to identify the available commands of the print device such that print application may use the identified commands to turn on the Wi-Fi hardware or Wi-Fi radio.

Once the Wi-Fi hardware or Wi-Fi radio of the print device is enabled and the print device is awake, the print device starts broadcasting the respective Wi-Fi identifiers. The operational process accordingly follows to block B1407, where the print application starts searching for the Wi-Fi network associated with the print device information. Whereas, in case the print application detects the Wi-Fi network identifier ("Yes", B1409) associated with the characteristic information of the print device ID, the operational process then follows the steps of initiating the Wi-Fi network connection request in block B1412 and thereby verify the Wi-Fi communication connection between the print device and the mobile device via LED flash pattern as shown B1413-B1414 & B1416. The print data is accordingly transmitted in block B1417 to complete the print job B1418 in a manner similar to as already described above.

Figure 15:
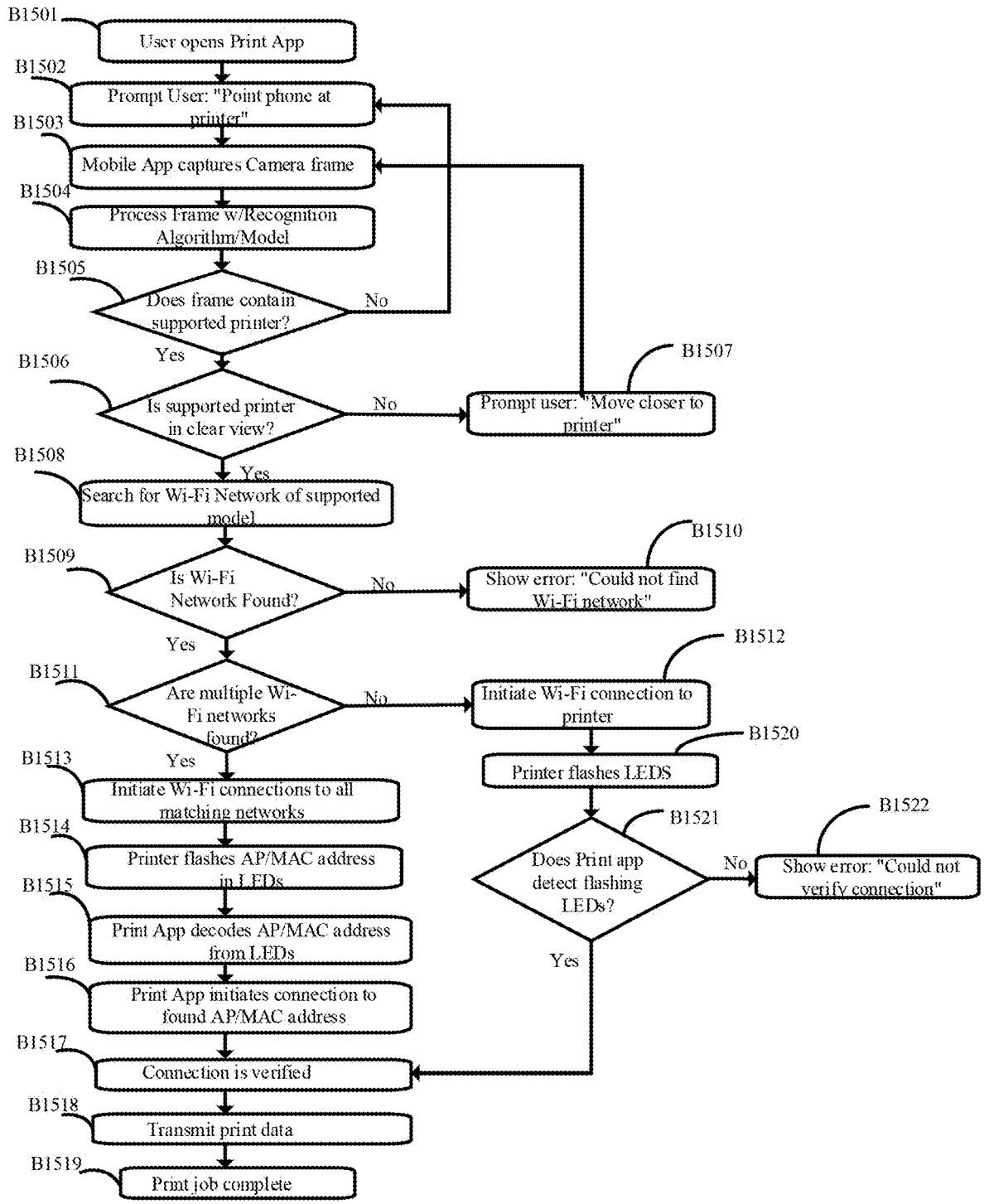
FIG. 15 illustrates an exemplary embodiment of a method of using a print application where multiple network connections are available.

FIG. 15 illustrates one of the exemplary embodiments where the print application detects more than one print device with similar print device ID's or device Model numbers at the network. The presence of print devices with similar device ID's and/or model numbers, may create a confusion to the user who is using the print application. As such, it will be hassle for the print application (or user) to determine which Wi-Fi network identifier belongs to which print device ID and whether the print device which is right in front of the mobile device to which user wish to connect, is the one, print application is trying to connect over the network. In such a scenario the print application may follows additional operational steps to verify the print device and the permitted Wi-Fi network connection with which the mobile device is authorized to connect.

Referring to FIG. 15, the operational process begins at block B1501 by opening the print application and following the operational steps from B1501-B1510 (details not provided here) in a similar manner as described in FIG. 11 (B1101-B1110).

Referring to, block B1511, where the response for finding the Wi-Fi network identifier of the supported print device is "Yes" (B1509), the process moves to block B1511. This indicates that the print application receives a response for block B1509 as "Yes" and thereafter receives a response "Yes" for block B1511. The operational process in block B1511 determines that there are multiple network identifiers available for the print device to recognize in the image frame. As such, in block B1511, it is determined that there are multiple Wi-Fi network identifiers available with the similar print device ID. In such a case, the print application follows the process step in B1513 which is that the print application initiates the network connection request to all the available/detected networks matching with the device ID.

To this initiated connection request, in B1514, the print application receives a response from the print device flashing the indicator pattern as a LED flash patterns. The print application detects the flash pattern within one or more image frames of the video data file and accordingly processes the information residing in the LED flash pattern. It is to be noted that the one or more LED flash patterns, as displayed on the display screen of the print device, may correspond to and/or encode, as an access point, IP address or MAC address information of a print device. Accordingly, in block B1515, the print application decodes the respective access point, IP address or MAC address information from the detected flashing pattern in the captured image frame. The print application thereby follows the process to block B1516 where the LED flash pattern and the MAC address or IP address information of the nearby print device is matched. The print application accordingly initiates a network connection to the network matching this print device information for example, MAC address or IP address information. The details of encoding and decoding the print device information such as access point, IP address or MAC address from an LED flash pattern is explained in FIG. 12 and may be referenced here.

It is to be noted that this particular operational process benefits the user to provide a validation that the print device which user wants to consider for the end job is indeed the one user is trying to connect at the network and thereby avoid the confusion to initiate the connection request if similar devices at the network are detected by the print application. Therefore, in block B1517 the connection request is verified to the supported print device with which user wish to connect and the print job is accordingly transmitted in block B1518 and the operational process for the print job is accordingly completed in block B1519.

Whereas, referring to the process step at block B1511, in which the print application does not determine multiple Wi-Fi network corresponding to the supported print device model, and have "NO" as a response from block B1511.

In such a scenario, the print application follows the request for initiating the Wi-Fi connection in block B1512, to this connection request, the print device in block B1520 starts flashing the indicator pattern as LED lights on the display screen. The print application, in block B1521, detects and recognizes the flashing pattern of LED lights in a similar manner as explained above and process follows to block B1517 where the connection request between the mobile device and the print device is verified. The print job is accordingly transmitted in B1518 and the process is completed in B1519. However, in case where the response is "NO" in B1521, i.e. when the print application is not able to detect the LED flashing pattern of the print device as a notification for the connection request, the user is notified regarding the error message on the display screen of the mobile device B1522 and the operational process ends.

Figure 16:
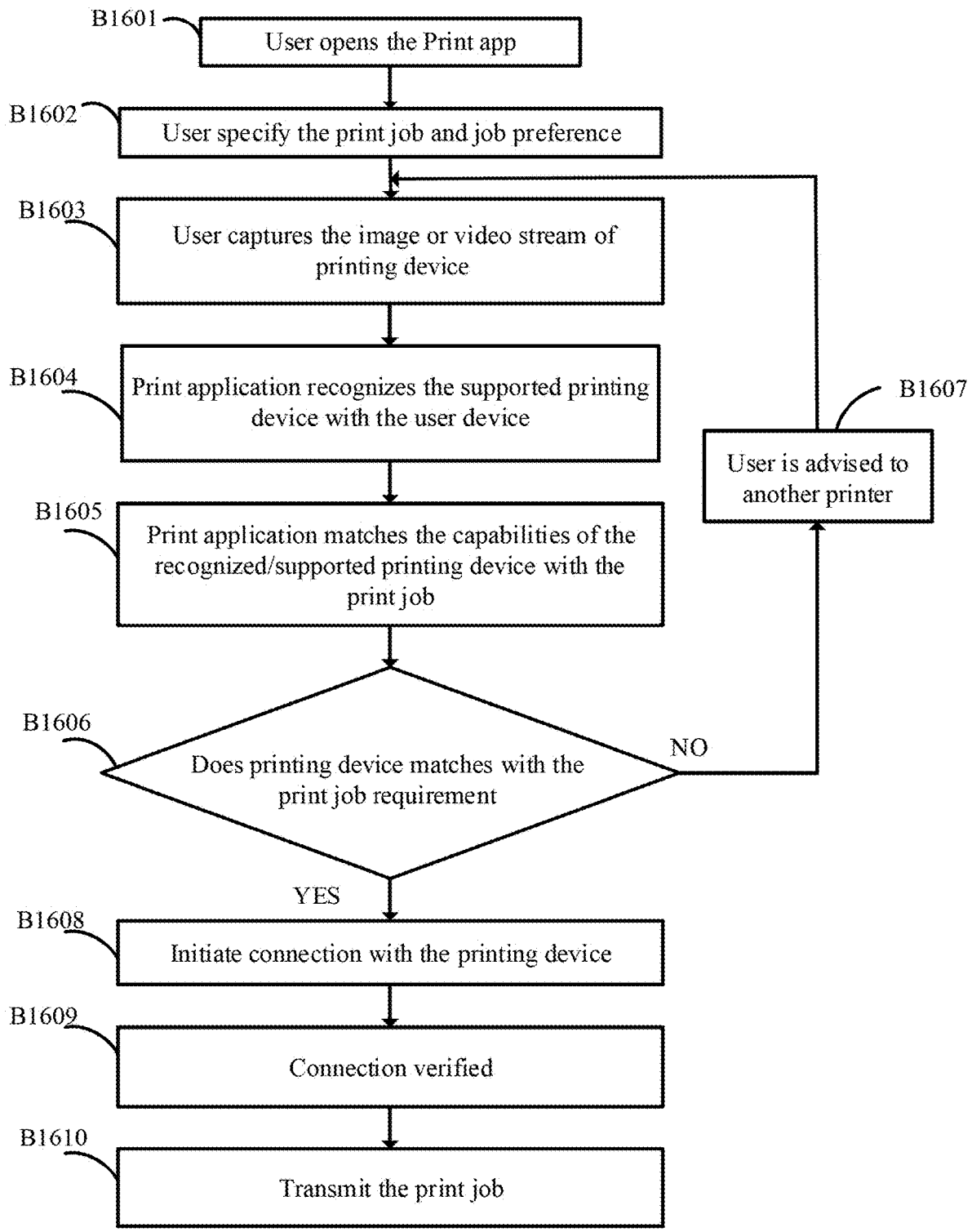
FIG. 16 illustrates an exemplary embodiment of a method of using a print application for determining a print device that matches print job requirements.

FIG. 16 illustrates an exemplary embodiment of suggesting a user via print application the print device that matches the user's print job requirement. The print application automatically determines a user's print job preferences. The print job preferences may include and is not limited to expected print quality, print settings or other parameters. The print application determines the preferred print device by matching the capabilities of the print device from a server, repository database or processor. In case the print application is not able to determine the suitable print device for user's print job requirements, the print application guides the user via print application for the suitable action to find out the preferred print device for the user's print job.

FIG. 16 begins with user opening the print application B1601. The operational step in block B1602 explains that the user has the print job already pre-stored in the memory storage or at the remote server of the mobile device. The user at the time of storing the print job may have specified various preferences that user wish to implement on the print job (for example, user may need a color print job, duplex print setting, letter size print).

The process moves to B1603, where the print application provides an instruction by displaying a text message (or image message) on the display screen of the mobile device to the user to point the mobile device camera towards the available print device to which the user wishes to connect, and instruct the user to capture the continuous image frame while streaming the video of the print device. The print application detects the print device from one or more image frames of the video data in B1604. The print application processes the captured image using the image recognition algorithm to determine whether the print device is a supported print device with the print application, and whether the print device is in clear view within the mobile device's camera view. The detail of steps for block B1603 and B1604 has already been explained in detail in FIG. 11, block B1104-B1106 and B1108 and can be referenced here.

In block B1604, it is assumed that the print application has recognized the characteristic information of the print device and the print device is supported by the print application. Following to block B1605, the print application retrieves the information and capabilities related to the recognized print device. The information of the print device's capabilities may be retrieved using one or more programs from the memory storage of the mobile device or from the remote server. The print application uses one or more programs to compare the information of the print device capabilities with the requirements of the desired print job preferences pre-stored in the memory storage of the mobile device by the user. The print application may use a capability matching algorithm or well-known matching algorithm to match the requirements of the desired print job to the capabilities of the print device to which print application is trying to connect.

Following to block B1606, the print application determines whether the print device matches the requirements of the desired print job. In block B1607, if the response is "NO" i.e. the capabilities of the print device does not match with the requirements of the print job preferences required by the user, the operational process follows to block B1607, where user is suggested to look for another print device available within the camera view of the mobile device. The operational process from B1603-B1606 are accordingly followed until the print application determines a compatible print device for the required print job.

In case the print application determines that the capabilities of the print device matches with the user's print job requirements, See, FIG. 16, response "Yes" from B1606. The print application accordingly sends a request to the print device to initiate the Wi-Fi connection with the mobile device.

It is to be noted that the connection request with the print device by searching the respective Wi-Fi communication protocol and initiating the Wi-Fi connection request follows the similar steps as defined in details in FIG. 11, B1107-B1114. The details of connecting the print device with the print application are therefore omitted here.

In block B1609 the Wi-Fi connection is verified with the mobile device and the print job is transmitted in block B1610 to the print device as selected by the print application.

Figure 17:
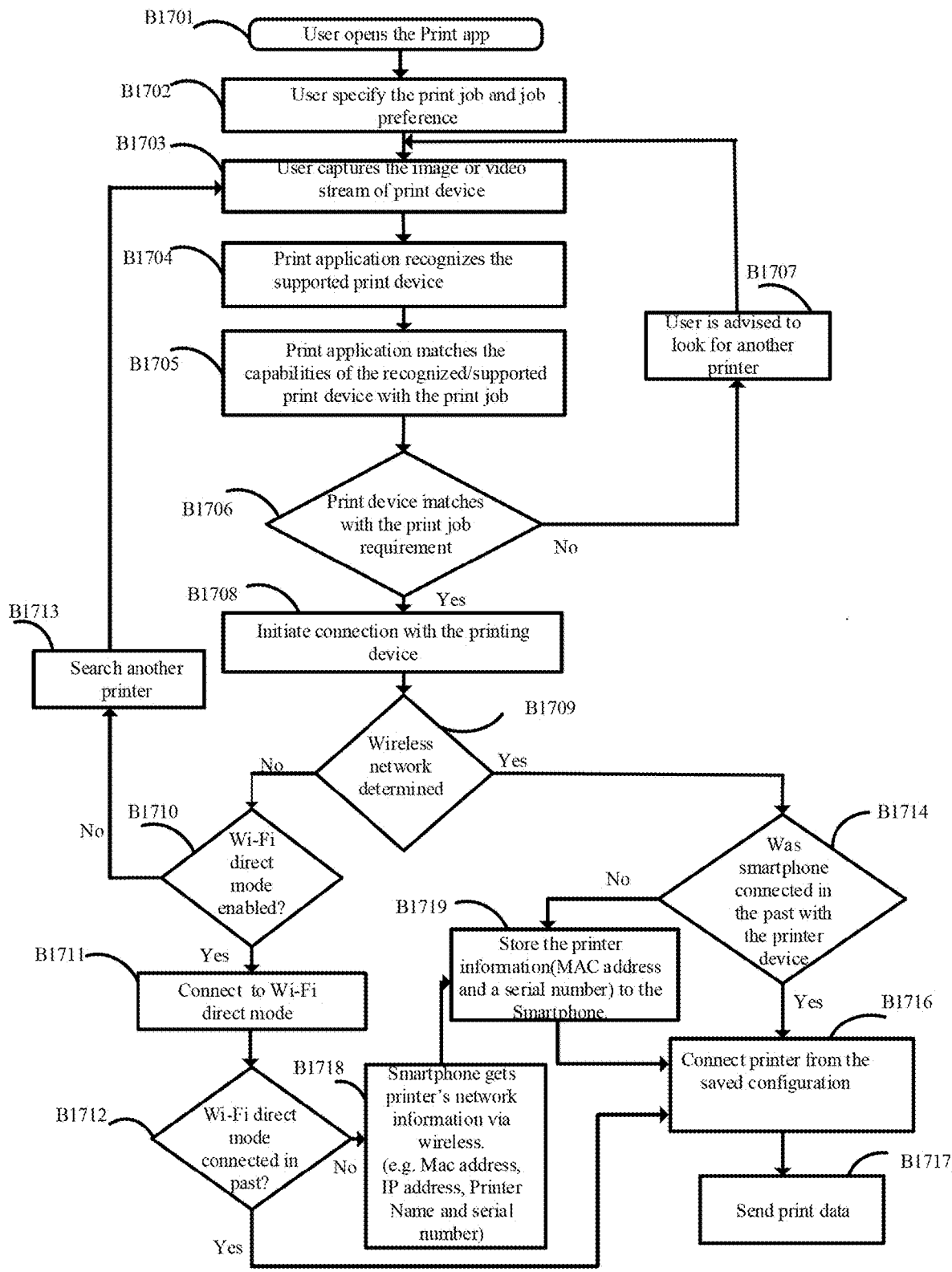
FIG. 17 illustrates an exemplary embodiment of a method of using the print application for determining a print device in a simultaneous network connection mode.

FIG. 17 illustrates an exemplary embodiment of suggesting, a user via print application, a print device that matches user's print job requirement. This exemplary embodiment includes operational steps which may be applicable for the devices that supports simultaneous connection configuration. The simultaneous connection configuration may be described as where the print device includes a setting options of a Wi-Fi direct network mode and an infrastructure Wi-Fi network mode simultaneously. In particular, this embodiment illustrates a scenario where the print application is not able to determine the infrastructure Wi-Fi network connection for the print device which meets the desired print job requirements. In such a scenario, additional steps in establishing the network connection are required.

The operational process begins with block B1701 where the user opens the print application in the mobile device. In B1702, the user pre-stores the print job specifying the print preference in the memory storage of the mobile device. The print job preference may include but is not limited to the print quality, print settings (e.g., duplex, color print, A4 sheet) The operational process then follows to block B1703 where user captures one or more image frames by streaming the video of the print devices available within user's environment. The print application processes the image frames as captured by the camera of the mobile device to determine the print devices supported by the print application. In B1704, the print application recognizes the print device supported by the print application. The process then moves to block B1705 where the print application determines the capabilities of the print device as determined in B1704. The process of determining the capabilities of the print device may include matching the attributes of the print job as required by user to the capabilities of the print device using matching algorithm in a similar way as explained in FIG. 16. In B1706, the print application determines whether the supported print device as determined in block B1704 is capable of handling the print job requirements as requested by the user.

In case the response from B1706 is "NO", the print application informs the user by displaying a message on the display screen of the mobile device to search for another available print device as shown in B1707 and thereby repeat the process from B1703 until a print device to perform the required print job is found and the process moves to B1706 "Yes".

Whereas, in case the response for B1706 is "Yes", the operational process moves to B1708 and the print application initiates the connection request by searching the Wi-Fi network connection with the print device at the network. Therefore, in block B1709, the print application determines whether the network connection matching the characteristic information of the print device and matching print job requirement as detected in the image frame is discovered. In case the print application is able to determine the infrastructure Wi-Fi network connection matching the print device information and print job requirements in block B1709 indicating the response as "Yes", the process follows to block B1714. In B1714 the print application determines whether the print device has ever connected in the past by user's mobile device at the determined infrastructure wireless network of B1709. The process of determining past network connections among mobile device and print device may be determined by referring a lookup table stored in the memory storage module of the mobile device or in the memory storage module of the print device. The past connection data may include information such as, the IP address of device, associated network connection name, SSID, MAC address, serial number etc. Therefore, upon determining response as "Yes" in B1714, i.e., the mobile device previously connected with the print device at the infrastructure wireless network, the print application in block B1716, automatically connects with the print device by using previously stored print device and network configuration information and print job accordingly sent to the print device in B1717.

However, in case the response in B1714 is "NO" indicating that the print application determines that mobile device and the print device does not have any history of network connection information pre-stored in the memory storage of the mobile device. This provides an information to the print application that both the devices (i.e., the print device and the mobile device) are initiating the network connection communication for the first time at the determined infrastructure wireless network. The print application in B1719 stores the print device serial number, MAC address, SSID information, or other related information in the storage module of mobile device for future connection configuration. In B1719 the print application stores the print device information in the storage unit of the mobile device, the operational process then follows to B1716, indicating that the print application initiates the infrastructure network connection request based on the stored information from B1719. In B1716 the print application connects the mobile device and the print device and thereby sends the print job to the print device in B1717.

Alternatively, in block B1709, where the print application receives a response "NO" indicating a negative response for determining the wireless network for the print device and print application. The operational process follows the step in Block B1710 whereby the print application determines if the connection with the print device in Wi-Fi direct mode can be established or not. As stated above, for this particular exemplary embodiment the print device is in simultaneous Wi-Fi connection mode. Therefore, when the print application determines that the infrastructure Wi-Fi connection protocol of the print device is not detected, the print application dynamically searches whether the Wi-Fi direct connection for the print device is enabled or not.

In a case where the print application receives a response "No" in B1710 indicating that the print application has determined that the Wi-Fi direct setting of the print device is not switched on (e.g. active), the print application follows the operational process B1713. In B1713, the print application displaying a message on the display screen of the mobile device that user should search for another available print device and the print application accordingly directed to B1703 to follow the process.

However, in a case the response for B1710 is "Yes", the print application connects the mobile device with the print device in Wi-Fi direct mode in B1711. Once the print application connects with print device in Wi-Fi direct mode in B1711, print application determines if the connected print device and the mobile device ever connected in the past or not in B1712. The print application may determine the past connection information in B1712 by referring a lookup table stored in the memory storage module of the mobile device or in the memory storage module of the print device. The one or more processor in control server may help to provide the connection management information by referring the past connection data saved in any one of the above-mentioned storage modules. The past connection data may include information such as, the IP address of device, associated network connection name, SSID, MAC address, serial number etc. In case the print application determines response "Yes" from B1712, the print application uses the pre-stored information from past connection of the print device and the mobile device to send a connection request to connect at the infrastructure Wi-Fi network matching the print device information. Accordingly, the print application follows the step in B1716 using print device information from the past connection and sending a request to connect with the print device in wireless network. In B1716, the print application connects the print device and the mobile device at the infrastructure Wi-Fi network and the print application thereby accordingly transmits the print data in B1717.

Whereas, in case the print application determines a response "No" from B1712, indicating that the print application determines that the print device and the mobile device did not have any past Wi-Fi Direct connection information pre-stored in the storage module. The print application in block B1718 retrieves the identification information of the print device such as MAC address, IP address or serial number, SSID, manufacture information etc. in B1718. Print application uses the information as collected in B1718 to follow the process step of B1719, indicating that the print application stores the information collected in B1718 in the memory storage of the mobile device. Once the print application stored the device information of the print device in B1719, the print application can use this stored information to connect with the print device as shown in B1716 and accordingly transmit the print job to the print device in B1717.

The scope of the present disclosure includes a non-transitory computer-readable medium storing instructions that, when executed by one or more processors, cause the one or more processors to perform one or more embodiments of the disclosure described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present disclosure has been described with reference to exemplary embodiments, it is to be understood that the disclosure is not limited to the disclosed exemplary embodiments.

We claim:

1. A method for establishing a wireless connection between a communication apparatus and an image processing apparatus, the method comprising:
    capturing one or more images of the image processing apparatus;
    determining, via image recognition processing performed on the one or more images of the image processing apparatus, identification information associated with the image processing apparatus;
    automatically searching for configuration information that includes one or more network identifiers associated with the determined identification information;
    initiating, when the configuration information is obtained, a connection request between the communication apparatus and the image processing apparatus using the one or more associated network identifiers;
    establishing a connection between the image processing apparatus and the communication apparatus,
    wherein searching for configuration information is performed, in a case where the identification information, which includes a device name, a device model number, and a device environment, associated with the image processing apparatus matches with pre-stored identification information that includes the device name, the device model number, and the device environment of the image processing apparatus; and
    the configuration information is obtained via manual entry and stored, in a case where the identification information, which includes the device name, the device model number, and the device environment associated with the image processing apparatus, does not match with the information of the pre-stored identification information.

2. The method according to claim 1, wherein determining the identification information includes identifying a device name, a device model number, and a device environment of the image processing apparatus.

3. The method according to claim 1, wherein determining the identification information further includes
    comparing the one or more images of the image processing apparatus to a set of stored identification information representing a plurality of different image processing apparatuses and selecting one of the plurality of image processing apparatuses that matches the image processing apparatus captured in the one or more images as the image processing apparatus that is associated with the identification information.

4. The method according to claim 1, wherein the configuration information includes identifying a network information and a device information associated with the identification information of the image processing apparatus.

5. The method according to claim 4, wherein the network information includes a network address, an IP domain, a login, or password associated with the identification information of the image processing apparatus.

6. The method according to claim 4, wherein the device information includes device login information, device policy information, or device setting information associated with the identification information of the image processing apparatus.

7. The method according to claim 1, wherein searching for configuration information further includes:
    comparing the identification information associated with the image processing apparatus to a set of stored identification information representing a plurality of different image processing apparatuses that includes respective configuration information associated with the plurality of different image processing apparatuses, and selecting one of the plurality of different image processing apparatuses and the respective configuration information that matches with the identification information of the images of the image processing apparatus.

8. The method according to claim 1, wherein the capturing of the one or more images includes single image frames or a stream of one or more image frames as a video file.

9. The method according to claim 1, wherein the automatically searching for the configuration information that includes the one or more network identifiers includes searching a communication network for one or more network identifiers matching the determined identification information, and initiating the connection request between the communication apparatus and the image processing apparatus when the communication network matching the network identifier is obtained.

10. The method according to claim 9, wherein initiating the connection request causes the image processing apparatus to output an indicator having one or more patterns, and wherein one or more images of the indicator is captured by the communication apparatus to obtain an indicator pattern.

11. The method according to claim 10, wherein the obtained indicator pattern is further decoded to provide a status information associated with the image processing apparatus, and wherein, the status information includes information for establishing the connection information between the image processing apparatus and the communication apparatus and is displayed on a display screen of the communication apparatus.

12. The method according to claim 11, wherein print data are transmitted between the communication apparatus and the image processing apparatus based on the obtained status information associated with the image processing apparatus.

13. The method according to claim 9, wherein initiating the connection request causes the image processing apparatus to generate a security code and output an indicator pattern having the security code, and wherein one of more images of the indicator pattern have the security code are captured and decoded by the communication apparatus to obtain the security code before establishing the connection.

14. A method according to claim 1, wherein determining via image recognition processing performed on the one or more images of the image processing apparatus further includes:

determining identification information and capability information associated with the image processing apparatus matching the requirement of print data, and automatically searching for configuration information that includes one or more network identifiers associated with the determined identification information and the capability information of the image processing apparatus.

15. A communication apparatus comprising:

one or more memories storing one or more programs; and one or more processors that, by executing the one or more programs, cause the communication apparatus to:

capture one or more images of an image processing apparatus;

determine, via image recognition processing performed on the one or more images of the image processing apparatus, identification information associated with the image processing apparatus;

automatically search for configuration information including one or more network identifiers associated with the determined identification information;

initiate, when the configuration information is obtained, a connection request between the communication apparatus and the image processing apparatus having the one or more network identifiers;

establish a connection between the image processing apparatus and the communication apparatus, wherein search for configuration information is performed, in a case where the identification information, which includes a device name, a device model number, and a device environment, associated with the image processing apparatus matches with pre-stored identification information that includes the device name, the device model number, and the device environment of the image processing apparatus; and the configuration information is obtained via manual entry and stored, in a case where the identification information, which includes the device name, the device model number, and the device environment associated with the image processing apparatus, does not match with the information of the pre-stored identification information.

16. A non-transitory computer readable medium storing computer-executable instructions that, when executed by one or more computers, cause the one or more computers to perform a method comprising:

capturing one or more images of an image processing apparatus;

determining, via image recognition processing performed on the one or more images of the image processing apparatus, identification information associated with the image processing apparatus;

automatically searching for configuration information including one or more network identifiers associated with the determined identification information;

initiating, when the configuration information is obtained, a connection request between the communication apparatus and the image processing apparatus using the one or more network identifiers;

establishing a connection between the image processing apparatus and the communication apparatus, wherein searching for configuration information is performed, in a case where the identification information, which includes a device name, a device model number, and a device environment, associated with the image processing apparatus matches with pre-stored identification information that includes the device name, the device model number, and the device environment of the image processing apparatus; and the configuration information is obtained via manual entry and stored, in a case where the identification information, which includes the device name, the device model number, and the device environment associated with the image processing apparatus, does not match with the information of the pre-stored identification information.

* * * * *